United States Patent [19]

Nakano

[11] Patent Number: 4,540,260

[45] Date of Patent: Sep. 10, 1985

[54] SHUTTER MECHANISM OF A CAMERA

[75] Inventor: Yoshiyuki Nakano, Tokyo, Japan

[73] Assignee: Nippon Kogaku K.K., Japan

[21] Appl. No.: 540,838

[22] Filed: Oct. 11, 1983

[30] Foreign Application Priority Data

Oct. 16, 1982 [JP] Japan .................... 57-156439[U]

[51] Int. Cl.³ .............................................. G03B 9/40
[52] U.S. Cl. .................................. 354/173.1; 354/247
[58] Field of Search ............... 354/246, 247, 249, 242, 354/173.1, 173.11, 266, 234.1, 235.1; 350/266

[56] References Cited

U.S. PATENT DOCUMENTS 4,114,174 9/1978 Onda et al. .......................... 354/249
4,447,142 5/1984 Suzuki et al. ....................... 354/246

Primary Examiner—John Gonzales
Assistant Examiner—David M. Gray
Attorney, Agent, or Firm—Shapiro and Shapiro

[57] ABSTRACT

A shutter of a camera having an opening member for opening a shutter aperture and a closing member for closing the aperture. The focal plane shutter shields the aperture from light by both the opening member and the closing member immediately after termination of film exposure.

9 Claims, 22 Drawing Figures

SHUTTER MECHANISM OF A CAMERA

BACKGROUND OF THE INVENTION

1. Field of the Invention

This invention relates to a shutter of a camera having an opening member for opening a shutter aperture and a closing member for closing the aperture, and particularly to a focal plane shutter for shielding the aperture from light by both of the opening member and the closing member immediately after termination of film exposure.

2. Description of the Prior Art

Focal plane shutters in which each of an opening member and a closing member comprises a plurality of blades have been widely used in cameras because of their compactness. In such focal plane shutters, before exposure, the opening blades of the opening member cover the aperture while being spread so as to partly overlap each other and at this time, the closing blades of the closing member are folded outside the aperture so as to completely overlap each other, and after exposure, the opening blades are folded outside the aperture and the closing blades cover the aperture while being spread. A slight quantity of light may leak from the area of partial overlap of each of the spread opening blades or closing blades and reach the film. Usually, this quantity of leakage light is negligible, but for example, where the object to be photographed includes the sun or high speed film is used, the quantity of leakage light becomes innegligible. Also, where the opening member or the closing member comprises a single blade, if plastics is used for the blade in order to make the blade light in weight, the leakage light will pose a problem because of the poor light-intercepting property of plastics.

To solve the problem of such leakage light, in the focal plane shutter disclosed in U.S. Pat. No. 4,114,174, the aperture is covered by both of the opening member and the closing member before exposure and after exposure. This shutter is provided with two springs for driving the opening member and two springs for driving the closing member, and in response to a shutter release operation, the first one of the four springs retracts the closing member from the aperture and subsequently, the second one of the four springs retracts the opening member from the aperture, thereby starting film exposure. After lapse of a predetermined exposure time, the third one of the four springs drives the closing member to cover the aperture and immediately after the exposure has been completed, the fourth one of the four springs drives the opening member to cover the aperture. However, this shutter has a disadvantage that a great force is required for shutter charge because the four springs must be charged at a time during shutter charge, and also has a disadvantage that the structure thereof is complicated because the use of the four springs necessitates the provision of a mechanism for restraining these springs in their charged state and releasing the restraint of the springs in succession.

SUMMARY OF THE INVENTION

It is an object of the present invention to provide a shutter of a camera which is relatively simple in construction and does not require a great force for shutter charge and moreover has an excellent light-leakage preventing effect.

The invention will become fully apparent from the following detailed description thereof taken in conjunction with the accompanying drawings.

DESCRIPTION OF THE PREFERRED EMBODIMENTS

Figure 1:
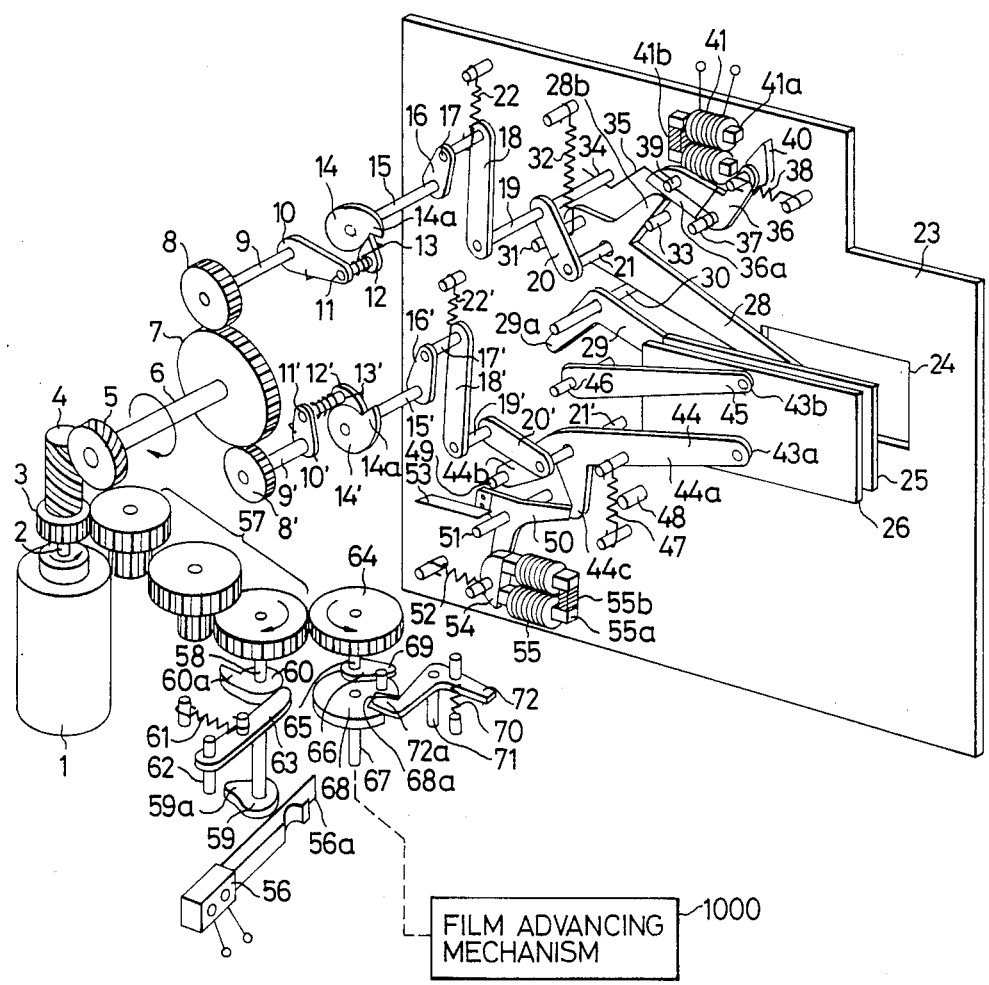
FIG. 1, is a perspective view showing a first embodiment of the present invention.

The present invention will hereinafter be described with respect to some embodiments thereof shown in the drawings.

Referring to FIG. 1 which is a perspective view of a first embodiment of the present invention, it shows the state in which the preparation for photography has been completed with the film wound up and the shutter charged. In FIG. 1, a film winding-up gear 3 and a shutter charging worm 4 are secured to the driving shaft 2 of a motor 1, and a gear 5 in mesh engagement with the worm 4 is designed to rotate clockwisely, i.e., in the direction of arrow, when the driving shaft 2 is rotated counter-clockwisely, i.e., in the direction of arrow, and to rotate counter-clockwise when the driving shaft 2 is rotated in the reverse direction. The rotation of the gear 5 is transmitted to a gear 7 through a shaft 6.

Two gears 8 and 8' having the same number of teeth are in mesh engagement with the gear 7, and the rotation of the gears 8 and 8' is transmitted to rotatable arms 10 and 10' through shafts 9 and 9', respectively. Pins 11 and 11' are secured to the free ends of the rotatable arms 10 and 10', respectively, and feed pawls 12 and 12' are pivotably supported on the pins 11 and 11', respectively. One of the feed pawls, 12, is biased counter-clockwisely about the pin 11 by a torsion spring 13, and the other feed pawl 12' is biased clockwisely about the pin 11' by a coil torsion spring 13'.

The tip end of the feed pawl 12 is in mesh engagement with the pawl portion 14a of a pawl plate 14, which is secured to one end of a shaft 15 provided coaxially with and opposed to the shaft 9. Only the counter-clockwise rotation of the gear 8 is transmitted to the shaft 15 through the pawl plate 14. The tip end of the other feed pawl 12' is in mesh engagement with the pawl portion 14'a of a pawl plate 14', which is secured to one end of a shaft 15' provided coaxially with and opposed to the shaft 9'. Only the clockwise rotation of the gear 8' is transmitted to the shaft 15' through the pawl plate 14'.

The members 10, 11, 12, 13, 14 and the members 10', 11', 12', 13', 14' respectively constitute one-way rotation transmitting mechanisms. Crank arms 16 and 16' are provided on the other ends of the shafts 15 and 15', respectively, and pins 17 and 17' are studded on the free ends of the crank arms, respectively. The pins 17 and 17' are rotatably coupled to one end of connecting rods 18 and 18', respectively, and the other ends of the connecting rods 18 and 18' are rotatably coupled to pins 19 and 19', respectively. The pins 19 and 19' are studded on one end of pivotable arms 20 and 20', respectively. One end of the pivotable arms 20 and 20' is pivotably supported by shafts 21 and 21', respectively, studded on a shutter base plate 23. The pivotable arms 20 and 20', with the crank arms 16, 16' and the connecting rods 18, 18', respectively constitute four-articulation link mechanisms, and the pivotable arms 20 and 20' pivot about shafts 21 and 21', respectively, in response to the rotation of the crank arms 16 and 16'. The crank arms 16 and 16' are biased upwardly by springs 22 and 22', respectively, through the pins 17 and 17' so that they always come to the positions of the top dead centers of their movement in the state of FIG. 1 in which the preparation for photography has been completed. These tension springs 22 and 22' are auxiliarly provided so that the drive transmitting systems from the pawl plates 14, 14' to the pivotable arms 20, 20' do not inadvertently move from the positions shown in FIG. 1 due to the unbalance or the like of the powers acting on the pawl plates 14, 14' and the members constituting the aforementioned four-articulation link mechanisms.

Figure 2:
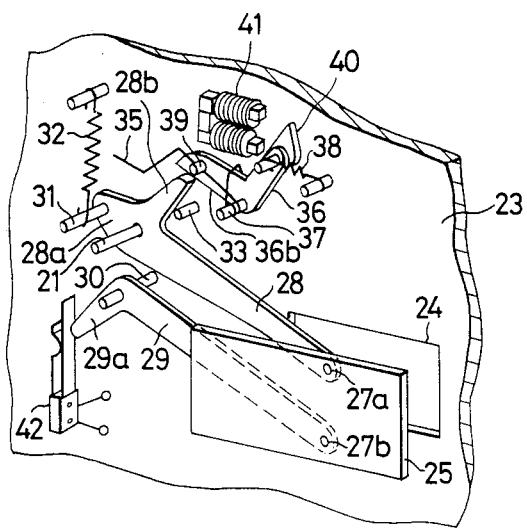
FIG. 2 is a perspective view showing the state when the closing member in FIG. 1 is in a light-intercepting position.
Figure 8A:
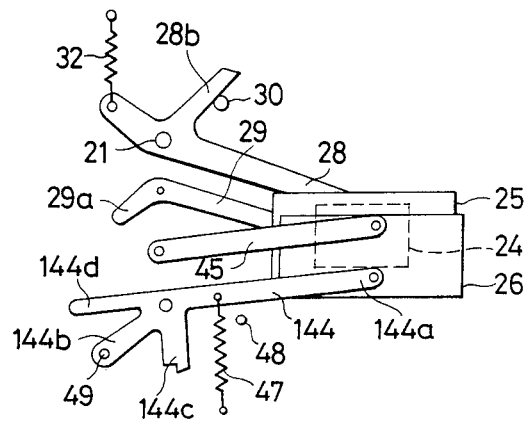
FIG. 8A is a plan view showing the positional relation between the opening and closing members in FIG. 6.
Figure 8B:
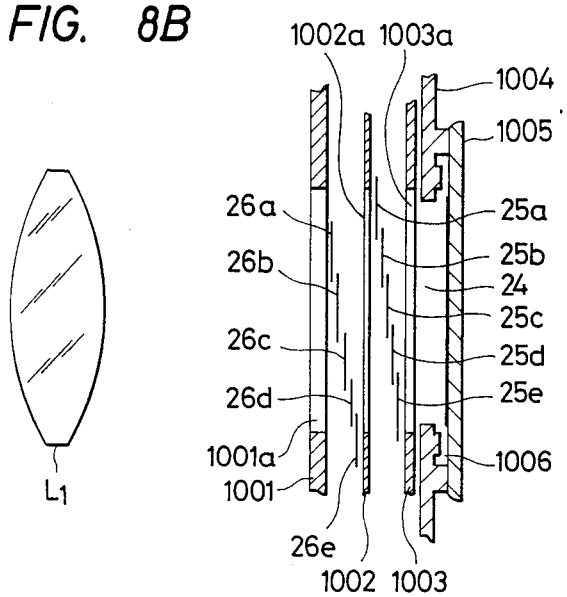
FIG. 8B is a cross-sectional view showing the specific constructions of the opening and closing members.

On the other hand, there are provided a shutter closing member (hereinafter referred to as the rearward blade) 25 and a shutter opening member (hereinafter referred to as the forward blade) 26 adapted to cover a shutter aperture 24 provided in a shutter base plate 23. For simplicity of illustration, the shutter closing member 25 and the shutter opening member 26 are respectively depicted as a single blade, but actually, they respectively comprise a plurality of blades as shown in FIG. 8B. In FIG. 2 the rearward blade 25 is supported by a rearward blade driving lever 28 and a rearward blade auxiliary lever 29 through two pins 27a and 27b. The rearward blade driving lever 28 is pivotably supported by the shaft 21, and the rearward blade auxiliary lever 29 is supported by a shaft 30 studded in the shutter base plate 23, and a parallelogram is formed by the pins 27a, 27b and the shafts 21, 30, and the rearward blade 25 is vertically parallel-moved and as viewed in FIG. 2 in response to pivotal movement of the rearward blade driving lever 28. A pin 31 to bear against the pivotable arm 20 is studded in one arm 28a of the rearward blade driving lever 28, and the rearward blade driving lever 28 is normally biased clockwisely by a rearward blade driving spring 32 secured to the pin 31, and in the light-intercepting position wherein the rearward blade 25 covers the aperture 24, a projection 28b formed on the rearward blade driving lever 28 bears against a stopper 33 studded in the shutter base plate 23, whereby clockwise rotation of the rearward blade driving lever is prevented.

Figure 3:
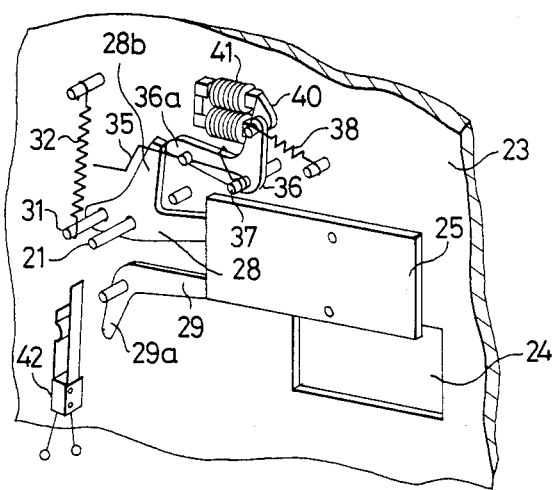
FIG. 3 is a perspective view showing the state when the closing member in FIG. 1 is in a non-light-intercepting position.

Referring again to FIG. 1, a pin 34 is studded on the free end of the pivotable arm 20 and is connected to a rearward blade locking lever 36 through a torsion spring 35. The rearward blade locking lever 36 is supported by a pin 37 studded in the shutter base plate 23 and is biased clockwisely about the pin 37 by a tension spring 38 having a biasing force weaker than that of the torsion spring 35. The torsion spring 35 is wound on the pin 37. One end of the spring 35 is engaged with the pin 34 studded in the pivotable arm 20, and clockwise displacement thereof is prevented by a pin 39 studded in one arm 36a of the rearward blade locking lever 36, and the other end of the spring 35 is restrained by the upper surface of the arm 36a, whereby counter-clockwise displacement thereof is prevented. Accordingly, when one end of the torsion spring 35 is rotated counter-clockwisely about the pin 37 by the pin 34, the rearward blade locking lever 36 is rotated counter-clockwisely against the biasing force of a tension spring 38, so that as shown in FIG. 3, the tip end of the arm 36a of the rearward blade locking lever 36 comes into engagement with the side surface of the projection 28b of the rearward blade driving lever 28, thereby preventing clockwise rotation of the rearward blade driving lever 28. An armature 40 is provided on the tip end of the other arm of the rearward blade locking lever 36 and is attracted into contact with the yoke 41a of a rearward blade restraining magnet 41.

The rearward blade restraining magnet 41 and a magnet 55 for restraining the forward blade 26 are so-called combination magnets comprising a pair of yokes 41a, 55a each having a coil on the outer periphery thereof and permanent magnets 41b, 55b sandwiched between the pair of yokes 41a, 55a. Accordingly, when the armatures 40 and 54 approach the yokes 41a and 51a, respectively, they are attracted to the end surfaces of the yokes by the magnetic forces of the permanent magnets, and are released from the attracted state by the supply of power to the coils.

The rearward blade auxiliary lever 29 has two arms, one of which supports the rearward blade 25 through a pin 27b as shown in FIG. 2 and the other arm 29a closes a switch 42 at the end of the clockwise rotation thereof, namely, when the rearward blade 25 has arrived at a light-intercepting position in which it covers the aperture 24. By the closing of this switch 42, power is supplied through a circuit, not shown, so that the motor 1 is revolved in reverse direction.

The forward blade 26 is supported by a forward blade driving lever 44 and a forward blade auxiliary lever 45 through two pins 43a and 43b, as shown in FIG. 1. The forward blade driving lever 44 is pivotably supported by a shaft 21', the forward blade auxiliary lever 45 is supported by a shaft 46 studded in the shutter base plate 23, and the forward blade 26, like the rearward blade 25, is vertically parallel-moved in response to pivotal movement of the forward blade driving lever 44. The forward blade driving lever 44 is biased clockwisely by a forward blade driving spring 47, and the arm 44a of the lever 44 comes into engagement with a stopper 48 studded in the shutter base plate 23 when the forward blade 26 has arrived at a non-light-intercepting position in which the aperture therein is completely open. A pin 49 is studded in the other arm 44b of the forward blade driving lever 44, and the pivotable lever 20', when rotated counter-clockwisely, causes the forward blade driving lever 44 to be rotated counter-clockwisely against the biasing force of the forward blade driving spring 47 through the pin 49.

The clockwise rotation of the forward blade driving lever 44 caused by the driving spring 47 is blocked by a forward blade locking lever 50 through the projection 44c of the lever 44. The forward blade locking lever 50 is pivotably supported on a shaft 51 studded in the shutter base plate 23 and is biased clockwisely by a tension spring 52. A plate spring 53 to bear against pin 19' is secured to one arm of the forward blade locking lever 50 and an armature 54 is provided on the other arm of the lever 50. The armature 54 is attracted and fixed to the yoke 55a of a forward blade restraining magnet 55. As soon as the forward blade restraining magnet 55 is electrically energized, the magnetic force of a permanent magnet 55b is offset and therefore, the forward blade locking lever 50 is rotated clockwisely about the shaft 51 by the biasing force of the tension spring 52. Accordingly, the restraint of the forward blade driving lever 44 is released and the forward blade 26 is moved by the biasing force of the driving spring 47.

A switch 56 is controlled by a cam 59 secured to the lower end of the terminal gear shaft 58 of a reduction gear train 57 connected to the gear 3. The reduction gear ratio of the reduction gear train 57 is set so that gear shafts 9 and 9' rotated through the worm 4 make one full rotation when the gear shaft 58 makes one-half rotation.

A pawl plate 60 is secured to the intermediate portion of the gear shaft 58, and when the pawl plate 60 is rotated through 180° from its position shown in FIG. 1, the pawl portion 60a thereof strikes against a restraining pawl 63 biased counter-clockwisely about a shaft 62 by a tension spring 61 and therefore, the clockwise rotation of the pawl plate 60 is blocked. During said 180° rotation, the crank arm 16 makes one full counter-clockwise rotation with the rotatable arm 10 and is stopped at the top dead center position shown in FIG. 1. When the cam 59 has rotated through 180° from its position shown in FIG. 1, the protrusion 59a of the cam 59 pushes the contact piece 56a of the switch 56 to thereby close this switch. The closing of this switch 56 supplies power to the forward blade restraining magnet 55 and also stops the motor.

A gear 64 having the same number of teeth as the terminal gear of the reduction gear train 57 is in mesh engagement with said terminal gear, and a rotatable arm 66 is securely mounted on the gear shaft 65 of the gear 64. A cut-away disc 68 is secured to a rotary shaft 67 provided on the extension of the gear shaft 65 and a pin 69 studded in the cut-away disc 68 is engaged with the rotatable arm 66. A limiting lever 72 is biased clockwisely about a shaft 71 by a tension spring 70 and blocks rotation of the rotary shaft 67 when the tip end 72a thereof is inserted into the groove 68a of the cut-away disc 68. The rotary shaft 67 is connected to a film advancing mechanism 1000 so that the film is advanced by an amount corresponding to one frame by one full rotation of the cut-away disc 68.

Figure 5:
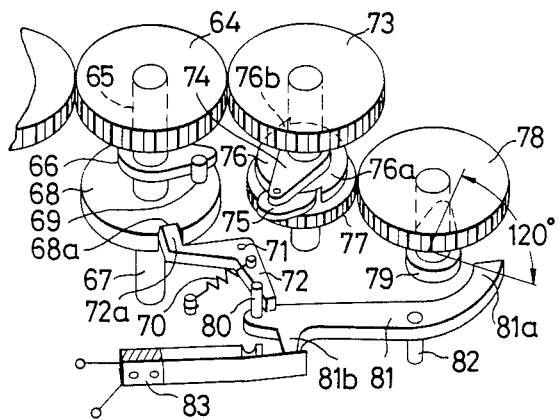
FIG. 5 is a perspective view of the film transporting portion in the embodiment of FIG. 1.

A gear 73 is in mesh engagement with the gear 64 as shown in FIG. 5, and only the counter-clockwise rotation of the gear 73 is transmitted to a gear 77 by a one-way clutch comprising a rotatable arm 74 rotatable with the gear 73, a pawl 75 provided on the arm 74 and a pawl plate 76 secured to the gear 77. Therefore a gear 78 in mesh engagement with the gear 77 and a cam plate 79 secured to the gear 78 are rorated only clockwisely. The pawl 75 is urged against the pawl plate 76 by a spring, not shown. The numbers of teeth of the gears 64, 73, 77 and 78 are set so that when the gear 64 makes one full clockwise rotation, the gears 77 and 73 make one full counter-clockwise rotation, respectively and the gear 78 in mesh engagement with the gear 77 makes two-thirds of one full rotation. Projections 76a and 76b engageable with the pawl 75 are formed on the peripheral surface of the pawl plate 76 at positions out of phase by 180° with each other. When the gear 73 rotates clockwisely through 180°, the pawl 75 turns through 180° about the pawl plate 76 and is displaced into engagement with the restraining projection 76b.

On the other hand, an intermediate lever 81 is pivotably supported by a shaft 82 and has a pin 80 engageable with the limiting lever 72, at one end thereof. The other end 81a of the intermediate lever 81 is capable of bearing against the cam plate 79, and rotation of the cam plate 79 causes clockwise rotation of the lever 81. By the clockwise rotation of the intermediate lever 81, the limiting lever 72 is rotated counter-clockwisely about the shaft 71 against the biasing force of the tension spring 70 and the tip end 72a thereof becomes disengaged from the groove 68a. The intermediate lever 81 is formed with a projection 81b for operating a plate spring switch 83. This plate spring switch 83 is closed when the intermediate lever 81 is rotated clockwisely, thereby causing reverse revolution (clockwise revolution as viewed in FIG. 1) of the motor 1 to be continued. When the tip end 72a of the limiting lever 72 has come into the groove 68a of the cut-away disc 68, the plate spring swtich 83 is adapted to be opened by the biasing force of the tension spring 70 through pin 80, thereby stopping the drive of the motor.

This action will hereinafter be described. When a release button, not shown, is depressed, the driving shaft 2 of the motor 1 starts to rotate counter-clockwisely as viewed in FIG. 1. Thereupon, with the driving shaft 2, the gear 3 and the worm 4 rotate counter-clockwisely and the pawl portion 60a of the pawl plate 60 rotates clockwisely through 180° until it engages the restraining pawl 63 through the reduction gear train 57 and at the same time, the rotatable arm 66 rotates counter-clockwisely through 180° and is stopped.

On the other hand, the gear 5 rotates clockwisely to rotate the two gears 8 and 8' counter-clockwisely through the intermediary of the gear 7. The counter-clockwise rotation of the gear 8 causes the crank arm 16 to make one full rotation through the feed pawl 12 and the pawl plate 14. In the meantime, the counter-clockwise rotation of the other gear 8' is not transmitted to the pawl plate 14' and accordingly, the crank arm 16' remains unmoved.

In FIG. 1, when the crank arm 16 starts to rotate counter-clockwise about the shaft 15 from the top dead center position, the connecting rod 18 lowers against the biasing force of the tension spring 22 while being displaced counter-clockwise to thereby rotate the pivotable arm 20 counter-clockwise about the shaft 21. This movement continues until the pin 17 of the crank arm 16 reaches its bottom dead center, that is, until the crank arm 16 turns through 180°. Due to the above-mentioned counter-clockwise rotation, the pivotable arm 20 comes into engagement with the pin 31 to rotate the rearward blade driving lever 28 counter-clockwise about the shaft 21 and by that rotation, it moves the rearward blade 25 from the light-intercepting position shown in FIGS. 2 and 4A to the non-light-intercepting position shown in FIGS. 3 and 4B wherein it is completely retracted from the aperture 24, and also charges the rearward blade driving spring 32. At this point of time, the shutter aperture 24 is shield from light only by the forward blade 26.

Due to the above-mentioned counter-clockwise rotation of the pivotable arm 20, the pin 34 studded in the pivotable arm 20 depresses one end of the torsion spring 35 downwardly as viewed in FIG. 1. Accordingly, by the biasing force of this torsion spring 35, the rearward blade locking lever 36 is given counter-clockwise rotation about the shaft 37. However, that counter-clockwise movement is blocked by one arm 36a of the rearward blade locking lever 36 bearing against the top of the projection 28b of the rearward blade driving lever 28. When the rearward blade driving lever 28 rotates counter-clockwise as described above and the rearward blade 25 retracts from the light-intercepting position of FIG. 4A to the non-light-intercepting position of FIG. 4B, the projection 28b thereof becomes disengaged from the tip end of the arm 36a and therefore, the rearward blade locking lever 36 is rotated counter-clockwise about the shaft 37 by the biasing force of the torsion spring 35 against the biasing force of the tension spring 38. Due to this rotation of the rearward blade locking lever 36, the armature 40 bears against the yoke 41a of the rearward blade restraining magnet 41 and is attracted by the magnetic force of the permanent magnet 41b. Accordingly, the rearward blade locking lever 36 is attracted to the magnet 41 and fixed as shown in FIG. 3.

When the crank arm 16 rotates counter-clockwise through 180° and the pin 17 reaches its bottom dead center position and thereafter further rotates counter-clockwise through 180° and again reaches its top dead center position, the pivotable arm 20 rotates clockwise and returns to its original position shown in FIG. 1.

Figure 4A:
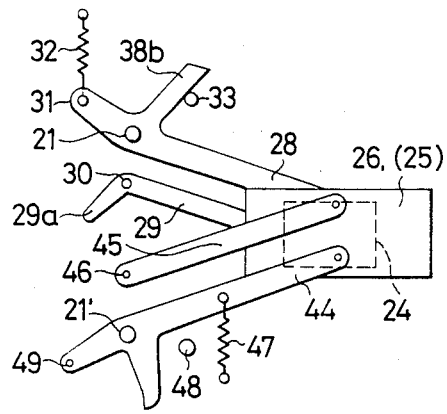
FIGS. 4A to 4D illustrate the opened and closed states of the shutter in FIG. 1, FIG. 4A showing the state in which the preparation for photography has been completed, FIG. 4B showing the state immediately before exposure in which the closing member has been moved to the non-light-intercepting position, FIG. 4C showing the state in which the opening member has been moved to the non-light-intercepting position, and FIG. 4D showing the state in which the closing member has been moved to the light-intercepting position.
Figure 4B:
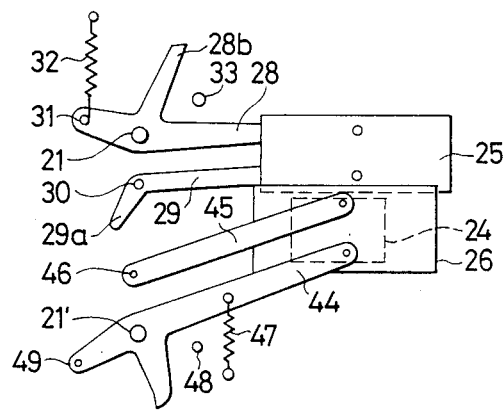
Figure 4C:
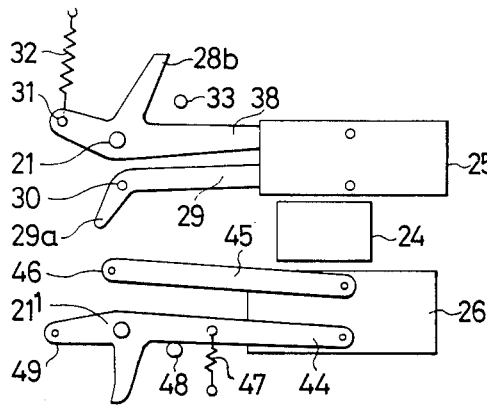

When the crank arm 16 has thus rotated through 360°, the cam 59 operatively associated with the gear 3 rotates clockwise through 180° to close the switch 56 and therefore, the forward blade restraining magnet 55 is electrically energized and the motor 1 is stopped. By this electrical energization, the armature 54 so far attracted to the forward blade restraining magnet 55 is released from the restraint. Accordingly, the forward blade locking lever 50 is rotated clockwise about the shaft 51 by the biasing force of the tension spring 52 and releases the restraint of the protrusion 44c of the forward blade driving lever 44. The forward blade driving lever 44 is rotated clockwise about the shaft 21' by the biasing force of the forward blade driving spring 47 to retract the forward blade 26 from the light-intercepting position down to the non-light-intercepting position, as shown in FIG. 4C. Thus, exposure of the film behind the opening 24 is started.

Subsequently, when the rearward blade restraining magnet 41 is electrically energized at a time during which a desired expore time is obtained, the rearward blade locking lever 36 is rotated clockwise about the shaft 37 by the biasing force of the tension spring 38 to thereby release the restraint of the rearward blade driving lever 28. Accordingly, the rearward blade driving lever 28 is rotated clockwise about the shaft 21 by the biasing force of the rearward blade driving spring 32 and as shown in FIG. 2, the projection 28b bears against the stopper 33 and is stopped thereby, and the rearward blade 25 covers the aperture 24 as shown in FIG. 4D, thus completing the exposure.

Figure 4D:
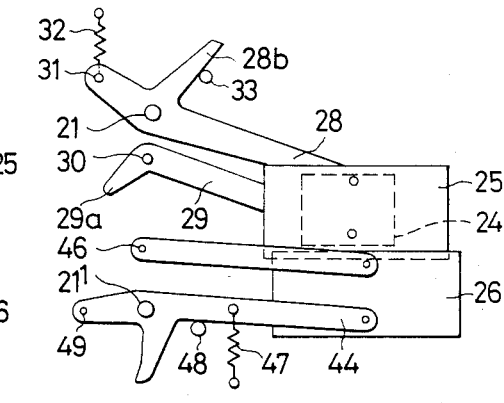

When the exposure is completed with the aperture 24 covered by the rearward blade 25 as shown in FIG. 2 or 4D, the other arm 29a of the rearward blade auxiliary lever 29 closes the switch 42 for reverse revolution and therefore, the driving shaft 2 of the motor 1 is rotated clockwise. By this reverse revolution of the motor, the gear 5 is rotated counter-clockwise to rotate the rotatable arms 10 and 10' clockwise through the gears 8 and 8'. Since the pawl 12 of the rotatable arm 10 does not mesh with the pawl plate 14, the rearward blade 25 is not driven by the clockwise rotation of the gear 8, while the clockwise rotation of the gear 8' causes clockwise rotation of the crank arm 16' through the pawl 12' and the pawl plate 14'. Accordingly, the pivotable arm 20' rotates counter-clockwise until the crank arm 16' rotates through 180° from its top dead center position to its bottom dead center position, and in the course of that rotation, the pivotable arm 20' rotates the forward blade driving lever 44 counter-clockwise through the pin 49 and thereby returns the forward blade 26 to a position in which it overlaps with the rearward blade 25, as shown in FIGS. 1 and 4A, and also charges the forward blade driving spring 47. At the same time, the pin 19' of the pivotable arm 20' rotates the forward blade locking lever 50 counter-clockwise about the shaft 51 against the biasing force of the tension spring 52 through the plate spring 53. By this rotation of the forward blade locking lever 50, the forward blade driving lever 44 is restrained on the forward blade locking lever 50 and at the same time, the armature 54 is attracted by the magnetic force of the forward blade restraining magnet.

When the crank arm 16' further rotates clockwise through 180° from its bottom dead center position back to its top dead center position, the pivotable arm 20' also rotates clockwise about the shaft 21' and returns to its position shown in FIG. 1.

Still thereafter, the reverse rotation (clockwise rotation) of the driving shaft 2 of the motor 1 is continued, whereby the windingup of the film and the charging of the quick return mirror of the single lens reflex camera are effected.

The film feeding system will now be described. In FIG. 5, the gear 73 is rotated clockwise through 180° with the rotatable arm 74 by the counter-clockwise rotation of the gear 64 corresponding to the aforementioned release operation. Then, it causes the pawl 75 in FIG. 5 to engage the restraining projection 76b. Thereafter, when the gear 64 rotates clockwisely as described previously, that is, when the arm 66 returns to its position shown in FIG. 5, the pawl 75 rotates counter-clockwisely the pawl plate 76 and the gear 77 through 180° due to its engagement with the restraining projection 76b until the arm 66 bears against the pin 69. Thereupon, the gear 78 rotates clockwisely through 120° with its speed reduced to two-thirds and in the meantime, the tip end of the cam plate 79 bears against the end 81a of the intermediate lever 81 to thereby rotate the intermediate lever 81 clockwisely. This rotation of the intermediate lever 81 causes the pin 80 to rotate the limiting lever 72 counter-clockwisely against the biasing force of the tension spring 70 and bring the tip end 72a thereof out of engagement with the groove 68a of the cut-away disc 68, thus releasing the restraint of the cut-away disc 68. At this point of time, as previously described, the forward blade 26 of the shutter returns to a position in which it dually covers the aperture 24 with the rearward blade 25.

If the driving shaft of the motor 1 continues reverse rotation (clockwise rotation) still thereafter, the gear 64 makes one full clockwise rotation with the rotatable arm 66 to cause the cut-away disc 68 to make one full rotation through the pin 69 and reaches the position shown in FIG. 1. Accordingly, this rotation of the cut-away disc 68 is transmitted to the film advancing mechanism 1000 through the shaft 67 and thus, the film is advanced by an amount corresponding to one frame. During this film advance, the gear 78 rotates clockwisely through 240° with the cam plate 79 and reaches the original position of FIG. 5. In this case, when the tip end of the cam plate 79 becomes disengaged from the end 81a of the intermediate lever 81, the limiting lever 72 is rotated clockwisely by the biasing force of the tension spring 70, but this rotation is blocked by the tip end 72a of the limiting lever 72 bearing against the outer periphery of the cut-away disc 68. Accordingly, the plate spring switch 83 remains closed and, when the groove 68a makes one full rotation and the tip end 68a of the limiting lever 72 comes into the groove 68a, the intermediate lever 81 is rotated counter-clockwisely by the biasing force of the tension spring 70 and the plate spring switch 83 thereof is opened and thus, the motor is stopped and the preparation for photography is completed.

Figure 17:
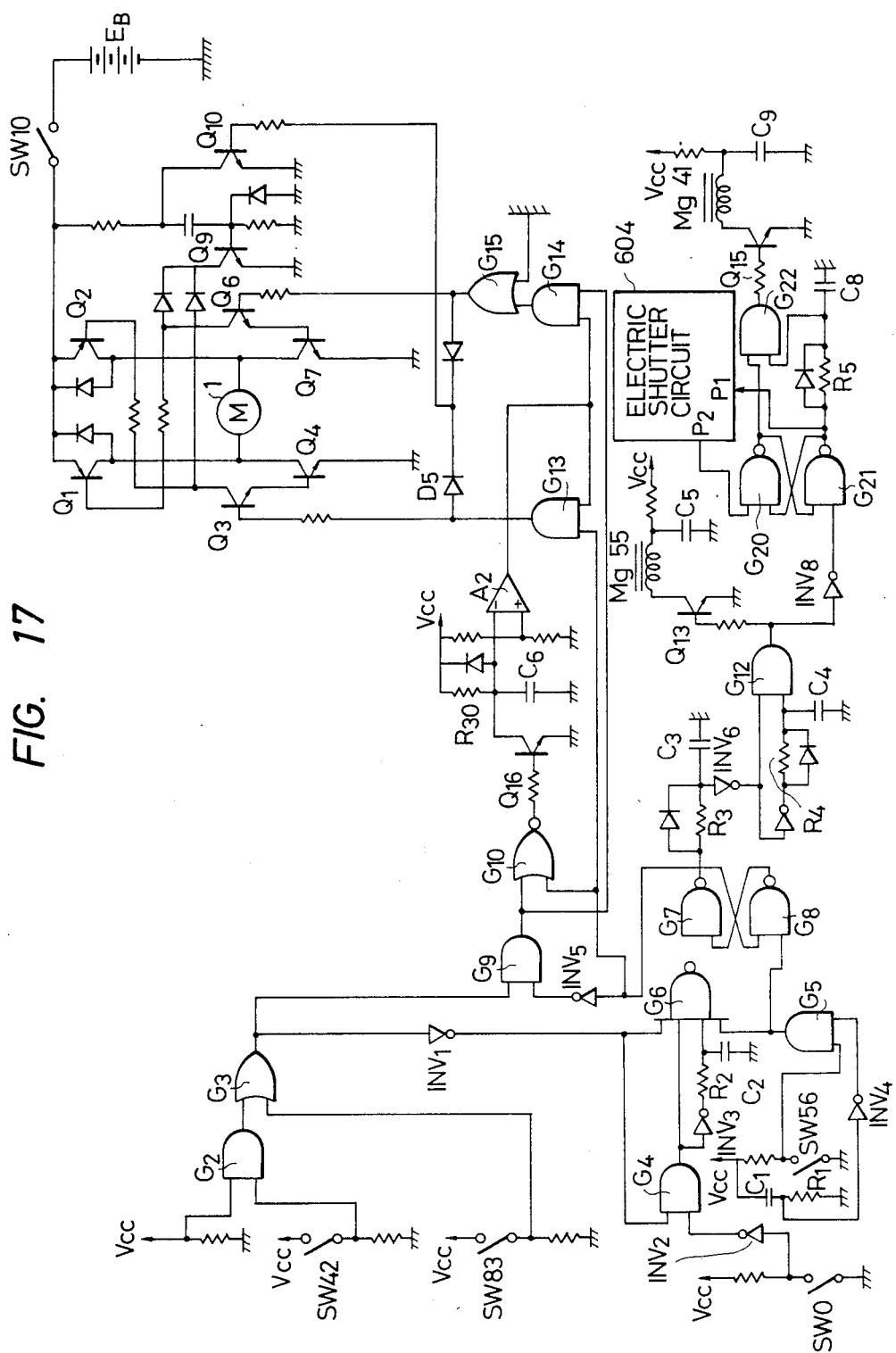
FIG. 17 is a circuit diagram showing the circuitry of the first embodiment.
Figure 18:
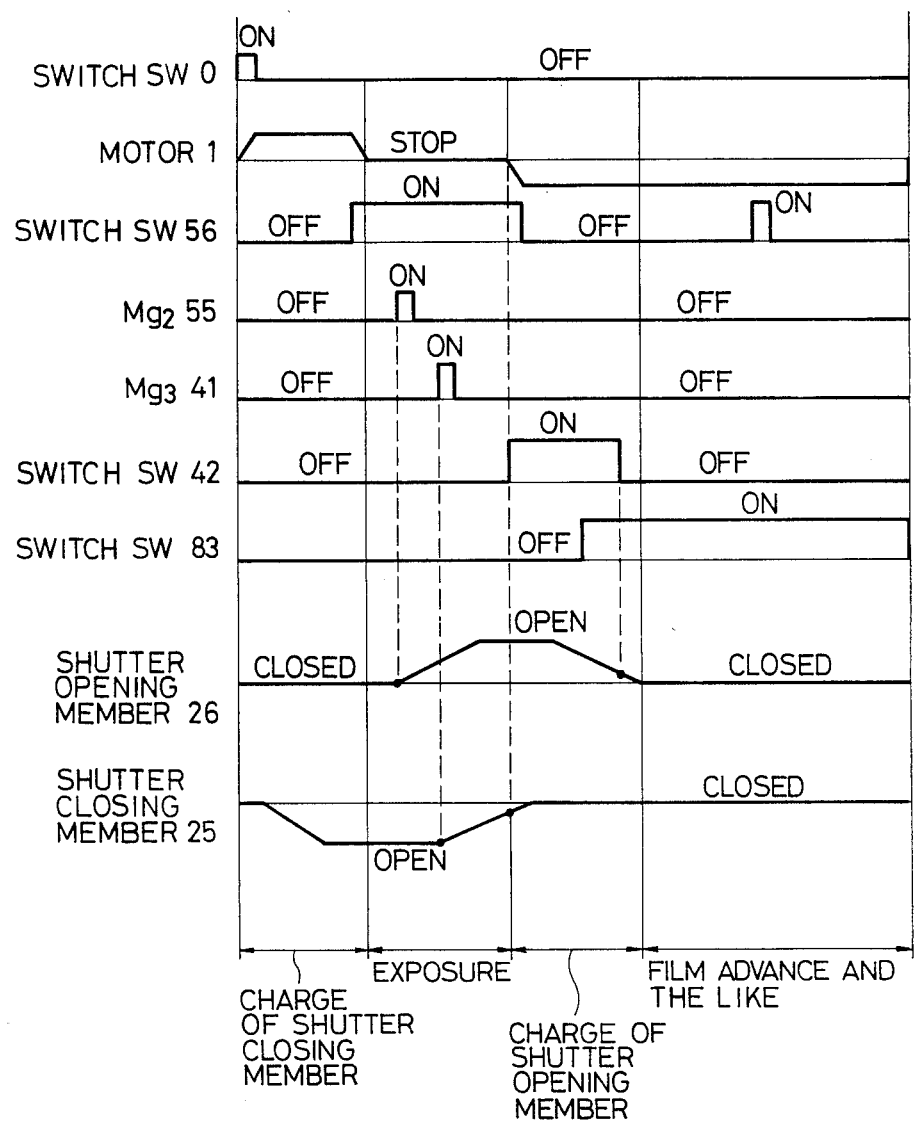
FIG. 18 is a timing chart for FIG. 17.

FIGS. 17 and 18 show the circuit of the above-described embodiment and the timing chart thereof, respectively.

In these Figures, the switches 42, 56, 83 and the magnets 41, 55 are shown as SW42, SW56, SW83, Mg41 and Mg55, respectively.

In the foregoing, the switch SW42 has been briefly described as being operatively associated with the rearward blade 25 so that it is closed when the rearward blade 25 is in the light-intercepting position, but more strictly speaking, the switch SW42 is operatively associated with the forward blade and the rearward blade so that it is closed when the forward blade is in the non-light-intercepting position and the rearward blade is in the light-intercepting position.

In FIG. 17, a switch SW0 shown at the left bottom is adapted to be closed when the release button is operated and to be opened when it is released. When the release button is depressed in a state in which a main switch SW10 shown at the right top is closed and a battery $E_B$ is supplying power, an inverter INV2 puts out an H (high) level output. At this time, both of the switches SW42 and SW83 are opened namely in OFF position, both of an AND gate G2 and an OR gate G3 put out L (low) level outputs and an inverter INV1 puts out an H level output. By the H level outputs of the two inverters, the output of an AND gate G4 is changed to an H level, whereby the output of an inverter INV3 changes to an L level. Also, at this time, the switch SW56 is in OFF position and an inverter INV4 puts out an H level output and therefore, the output of an AND gate G5 also assumes an H level. Accordingly, the output of an AND gate G6 assumes an L level for a predetermined very short time determined by a time constant circuit R2, C2, more specifically, for a time necessary to set flip-flops G7 and G8, after the release button switch SW0 has been closed. This L level output inverts a NAND gate G7 into an H level. This H level output holds the output of an AND gate G9 at an L level through an inverter INV5 and also keeps the output of a NOR gate G10 at an L level. Thereby, a transistor Q16 is turned off namely rendered nonconductive and a timer curcuit R30, C6, A2 produces an H level output for a predetermined relatively long time. Also, the H level output of the NAND gate G7 renders the output of an AND gate G13 into an H level, and this H level output turns on a transistor Q3, which in turn turns on transistors Q2 and Q4. The L level output of the AND gate G9 renders the outputs of both of gates G14 and G15 into L level outputs and therefore, a transistor Q6 is turned off, and this turns off transistors Q1 and Q7. In this manner, power is supplied from the power source $E_B$ through the transistor Q2, motor 1 and transistor Q4 and thus, the motor 1 revolves in forward direction to move the rearward blade toward non-light-intercepting position. In the vicinity of the completion of this movement, the switch SW56 is closed, the output of the AND gate G5 is inverted into an L level, the flip-flops G7 and G8 are reset and the output of the NAND gate G7 is rendered into an L level output. This L level output turns off transistors Q3 and Q10 through an AND gate G13. By this conduction of the transistor Q10, a transistor Q9 is turned on for a predetermined time, to turn on both of transistors Q1 and Q2. The conduction of these two transistors Q1 and Q2 shortcircuits the motor 1 to suddenly stop this motor. The L level output of the NAND gate G7 renders the output of an AND gate G12 into an H level through an inverter INV6 for a predetermined time determined by a time constant circuit R4, C4 after a predetermined time determined by a time constant circuit R3, C3. This H level output turns on a transistor Q13, and causes a capacitor C5 to discharge and energizes the magnet Mg55. Upon this energization, the forward blade moves and starts film exposure. The H level output of the AND gate G12 inverts the outputs of NAND gates G20 and G21 constituting flip-flop into an L level and an H level, respectively, through an inverter INV8. An electric shutter circuit 604 starts to count the shutter time when the H level output of the gate G21 is input to a terminal P1, and produces an L level output at a terminal P2 after lapse of a predetermined time. This L level output resets flip-flop G20 and G21 and renders the output of an AND gate G22 into an H level through a time constant circuit R5, C8. This H level output turns on a transistor Q15 and the magnet Mg41 is energized by the discharge current of a capacitor C9. This energization moves the rearward blade to terminate the exposure. When the rearward blade reaches the light-intercepting position, the switch SW42 is closed. The closing of this switch renders the output of an AND gate G9 into an H level through gates G2 and G3. This H level output turns on a transistor Q6 through gates G14 and G15, and this turns on both of transistors Q1 and Q7, thereby revolving the motor 1 in reverse direction. This reverse revolution moves the forward blade toward the light-intercepting position and thereafter transports the film by an amount corresponding to one frame. The switch SW83 is closed in the course of the movement of the forward blade, and is opened when the transport of the film is terminated. The opening of this switch renders the output of an OR gate G3 into an L level because the switch SW42 is in OFF position at this time, and this L level output turns off both of transistors Q6 and Q10 through AND gates G9, G14 and OR gate G15, thus suddenly stopping the motor 1.

Figure 6:
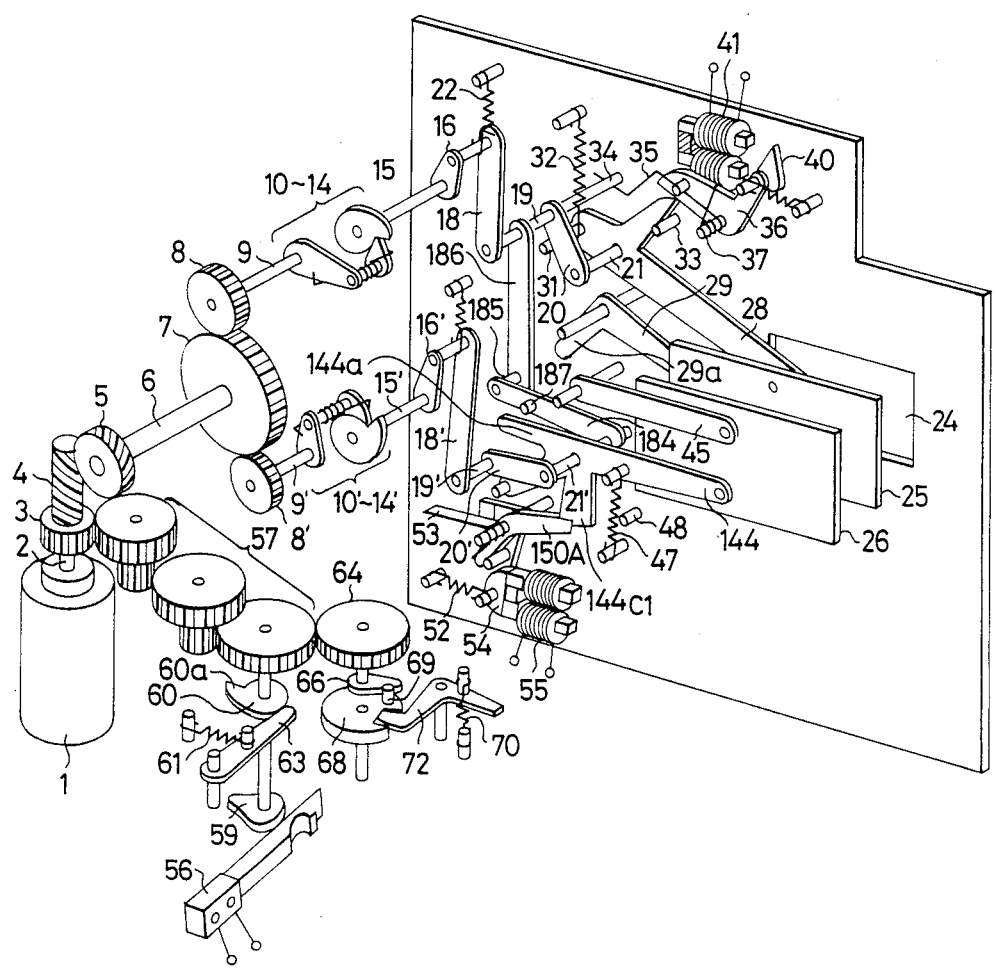
FIG. 6 is a perspective view of a second embodiment of the present invention.

FIG. 6 is a perspective view showing a second embodiment of the present invention. In FIG. 6, members similar in function to those in the first embodiment of FIG. 1 are given similar reference numerals. Accordingly, detailed description of the parts given similar reference numerals is omitted here and the differences of the second embodiment from the first embodiment will hereinafter be described chiefly.

Figure 7:
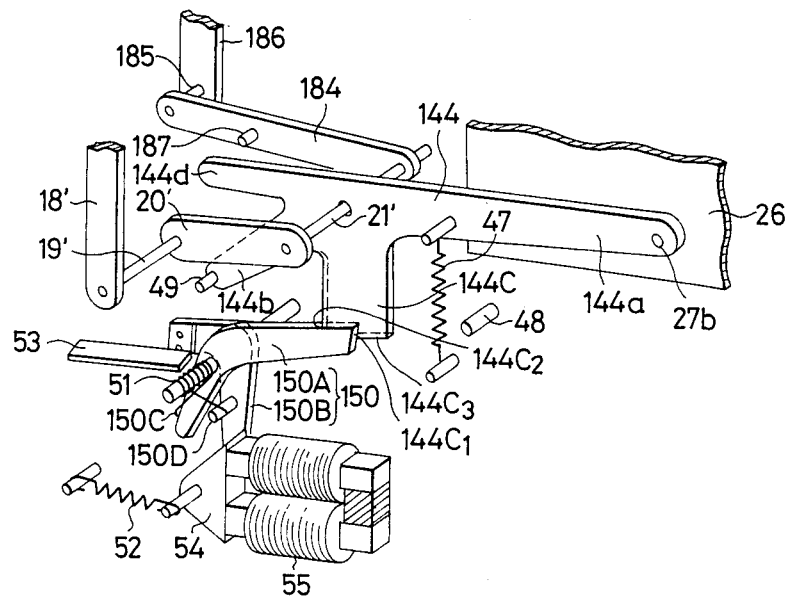
FIG. 7 is an enlarged perspective view showing the intermediate position holding state of the opening member in FIG. 6.

FIG. 6, like FIG. 1, shows the state in which the preparation for photography has been completed and immediately before the release operation occurs. The forward blade 26 is in a position wherein it covers only the central and lower portions of the aperture 24 as shown in FIG. 8, and the upper portion of the aperture 24 is covered only by the rearward blade 25. That is, the forward blade 26 is positioned at a lower location than in the state shown in FIG. 1. FIG. 7 is an enlarged view of the forward blade restraining portion showing such state. A forward blade driving lever 144 is formed with a first restraining portion $144c_1$ and a second restraining portion $144c_2$ (the left side surface of a projection 144c) on the projection 144c thereof. A forward blade locking lever 150 is engaged with the first restraining portion $144c_1$. Accordingly, the clockwise rotation of the forward blade driving lever 144 caused by the forward blade driving spring 47 is blocked and the forward blade 26 is held in a position for shielding only a portion of the aperture 24 from light.

The forward blade locking lever 150 comprises a first locking lever 150A and a second locking lever 150B pivotably supported on a shaft 51, the two locking levers being coupled to each other by a torsion spring 150C wound on the shaft 51. The first locking lever 150A is biased counter-clockwise by the torsion spring 150C and the second locking lever 150B is biased clockwisely by the torsion spring 150C through a pin 150D. The first restraining portion $144c_1$ of the forward blade driving lever 144 is engaged with one end of the first locking lever 150A. An armature 54 is provided on one end of the second locking lever 150B and a plate spring 53 is provided on the other end of the second locking lever, the armature 54 being attracted to a forward blade restraining magnet 55.

When a release button, not shown, is depressed to supply power to the motor 1, the driving shaft 2 starts to rotate counter-clockwisely. This rotation of the driving shaft 2 is transmitted to the worm 4, the gear 5, the shaft 6, the gears 7, 8, the shaft 9, the one-way clutches 10–14 and the shaft 15 and rotates the crank arm 16 counter-clockwisely to rotate the pivotable lever 20 counter-clockwisely through the connecting rod 18 and the pin 19. By this rotation of the pivotable lever 20, the rearward blade driving lever 28 is rotated counter-clockwisely through the pin 31 to retract the rearward blade 25 upwardly relative to the aperture 24. At the same time, by the rotation of the pivotable lever 20, the rearward blade locking lever 36 is rotated counter-clockwisely through the torsion spring 35 and the armature 40 is attracted to the rearward blade restraining magnet 41. Accordingly, the rearward blade 25 is restrained at a non-light-intercepting position retracted from the aperture 24 in the same manner as shown in FIG. 3.

An auxiliary pivotable arm 184 is pivotably supported on the shaft 21′ which rotatably supports the forward blade driving lever 144. A pin 185 provided on the free end of the auxiliary pivotable arm 184 and a pin 19 provided on the free end of the pivotable arm 20 are connected together by an auxiliary rod 186, and the pivotable arm 20, the auxiliary rod 186 and the auxiliary pivotable arm 184 together constitute a four-articulation link mechanism. A pin 187 adapted to bear against the third arm 144d of the forward blade driving lever 144 is studded in the auxiliary pivotable arm 184.

When the pivotable arm 20 is rotated counter-clockwisely, the auxiliary pivotable arm 184 also rotates counter-clockwisely through the auxiliary rod 186. In the course of this counter-clockwise rotation of the auxiliary pivotable arm 184, the pin 187 bears against the arm 144d to rotate the forward blade driving lever 144 counter-clockwisely and, when the rearward blade 25 retracts from the aperture 24, the forward blade 26 reaches the light-intercepting position in which it fully covers the aperture 24. When the forward blade driving lever 144 rotates counter-clockwisely, the first restraining portion $144c_1$ thereof becomes disengaged from the tip end of the first locking lever 150A and further, the second restraining portion $144c_2$ becomes disengaged from the tip end of the first locking lever 150A. Due to the disengagement of the second restraining portion $144c_2$, the first locking lever 150A is rotated counter-clockwisely about the shaft 51 by the biasing force of the torsion spring 150C until it bears against the pin 150D studded in the second locking lever 150B, and thus becomes engageable with the second restraining portion $144c_2$.

The above-described operation in which the forward blade 26 fully covers the aperture 24 and the rearward blade 25 fully retracts from the aperture 24 is effected by the first 180° rotation of the crank arm 16 from its top dead center position to its bottom dead center position and, when the crank arm 16 continues its rotation past the bottom dead center position, both of the pivotable arm 20 and the auxiliary pivotable arm 184 rotate clockwisely. At this time, the rearward blade driving lever 28 is restrained by the rearward blade locking lever 36 due to the attraction of the rearward blade restraining magnet and therefore, the pivotable arm 20 continues to rotate clockwisely while leaving the pin 31 in that position. Also, when the auxiliary pivotable arm 184 rotates clockwisely, the forward blade driving lever 144 tries to rotate clockwisely with the aid of the biasing force of the forward blade driving spring 47, but that rotation is blocked by the first locking lever 150A being engaged with the second restraining portion $144c_2$.

When the crank arm 16 makes one full rotation and the pivotable lever 20 and the auxiliary pivotable lever 184 return to their original positions, the switch 56 is closed, whereby the motor 1 is stopped and at the same time, the forward blade restraining magnet 55 is electrically energized. Upon this energization, the second locking lever 150B is rotated clockwisely about the shaft 51 by the biasing force of the tension spring 52, and the first locking lever 150A also is rotated clockwisely with the second locking lever 150B to release the restraint of the forward blade driving lever 144.

The forward blade driving lever 144, when its restraint is released, rotates clockwisely as in the first embodiment to retract the forward blade 26 from the aperture 24, thus starting exposure. After a predetermined time delay, the rearward blade restraining magnet 41 is electrically energized, thereby releasing the restraint of the rearward blade driving lever 28. Accordingly, the rearward blade driving lever 28 is rotated clockwisely by the biasing force of the rearward blade driving spring 32 and the aperture 24 is covered by the rearward blade 25, thus terminating the exposure. At the same time, the rearward blade auxiliary lever 29 is rotated clockwisely and closes the reversing switch 42 of FIG. 2 at the end of its clockwise rotation.

When the reversing switch 42 is closed, the pin 19' revolves about the shaft 21' in the same manner as described with respect to the first embodiment and bears against the plate spring 53 secured to the second locking lever 150B, thereby rotating the second locking lever 150B counter-clockwisely about the shaft 51. By this rotation of the second locking lever 150B, the armature 54 is attracted and fixed to the forward blade restraining magnet 55. On the other hand, the pivotable arm 20', as shown in FIG. 7, rotates the forward blade driving lever 144 counter-clockwisely through the pin 49 studded in the forward blade driving lever 144. In this case, however, unlike the first embodiment, even if the crank arm 16' reaches its bottom dead center position, the forward blade 26 does not come to fully cover the aperture 24 and the first restraining portion $144c_1$ arrives at the tip end of the first locking lever 150A. When the first restraining portion $144c_1$ arrives at the tip end of the first locking lever 150A, the first locking lever 150A which has so far been in contact with the end surface $144c_3$ of the projection 144c is rotated counter-clockwisely about the shaft 150D by the biasing force of the torsion spring 150C and comes into engagement with the first restraining portion $144c_1$ and therefore, the forward blade 26 is restrained at that position through the forward blade driving lever 144. The driving shaft 2 of the motor 1 continues reverse rotation (clockwise rotation) still thereafter and, as in the first embodiment, it rotates the gear 5 in reverse direction and drives the film advancing mechanism through the reduction gear train 57 and the gear 64.

The effect of the second embodiment will hereinafter be described.

In addition to the aforementioned switch 42, several switches including a synchro switch for synchronizing the light emission of an electronic flash unit with the operation of the shutter are provided in the shutter mechanism. If, for example, an attempt is made to provide a projected pin on the forward blade auxiliary lever 45 in order to operate the synchro switch, such projected pin cannot be provided in the portion wherein this lever 45 intersects and overlaps with the rearward blade auxiliary lever 29. Accordingly, said overlapping portion should preferably be small. The second embodiment is designed such that the forward blade 26 does not fully cover the aperture 24 when film advance is completed and therefore, said overlapping portion can be made small in the second embodiment, as compared with the construction in which the forward blade fully covers the aperture when film advance is completed.

In the second embodiment, the opening member 26 covers most of the aperture 24 but does not cover a part thereof immediately after termination of exposure and therefore, the incompleteness of light interception at that part of the aperture, namely, light leakage, poses a problem. However, since each of the shutter opening member and closing member is actually comprised of a plurality of completely opaque blades, the above-mentioned light leakage can be easily prevented as described below.

In FIG. 8B, a plurality of opening blades 26a, 26b, 26c, 26d and 26e constituting an opening member are disposed between a shutter base plate 1001 having an aperture 1001a and a partition plate 1002 having an aperture 1002a. A plurality of closing blades 25a, 25b, 25c, 25d and 25e constituting a closing member are disposed between the partition plate 1002 and a cover plate 1003 having an aperture 1003a. A film 1006 is positioned between a camera body 1004 and a pressure plate 1005. The opening blades 26a–26e and the closing blades 25a–25e are both spread so that adjacent blades partly overlap each other, and the former covers most of the shutter aperture 24 except the upper portion thereof and the latter fully covers the shutter aperture 24. The light passed through a picture-taking lens L1 is intercepted by the opening and closing blades. In a shutter comprising a plurality of such blades, light leakage occurs between adjacent blades. Although the opening blades 26a–26e do not cover a part of the shutter aperture 24, the overlapping portions between adjacent closing blades 25a and 25b, 25b and 25c, 25c and 25d, 25d and 25e are covered without fail and therefore, the above-mentioned light leakage can be prevented completely.

Figure 9:
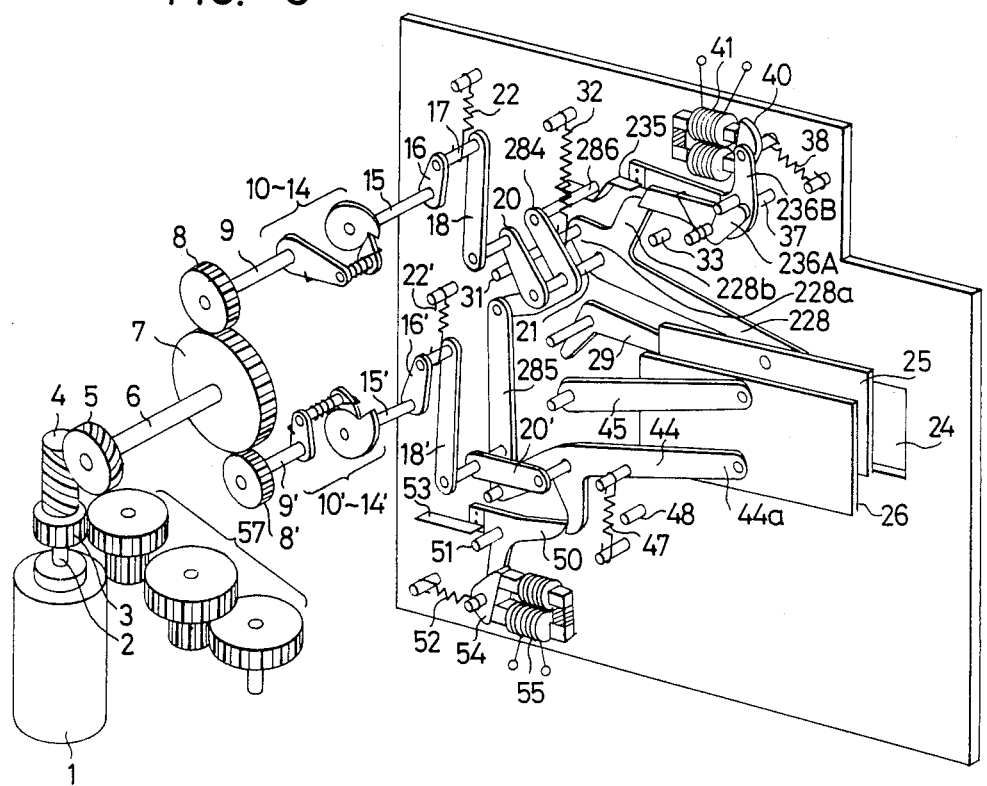
FIG. 9 is a perspective view of a third embodiment of the present invention.
Figure 10:
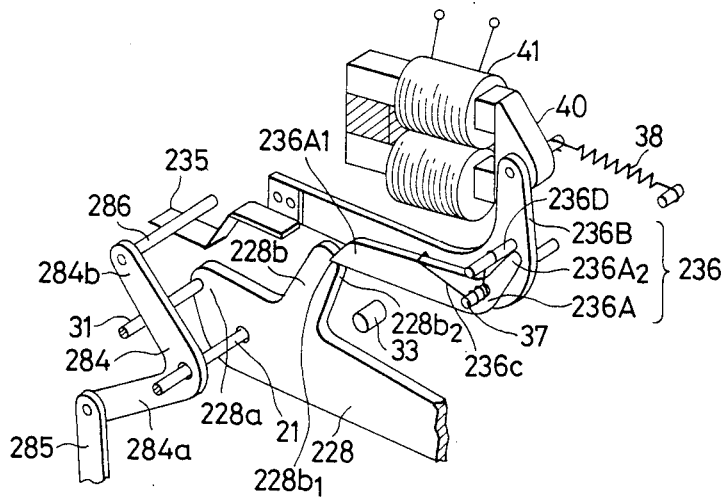
FIG. 10 is an enlarged perspective view showing the intermediate position holding state of the closing member in FIG. 9.

FIG. 9 is a perspective view of a third embodiment of the present invention and shows the state immediately before the release operation in which the preparation for photography has been completed, and FIG. 10 is an enlarged perspective view of the rearward blade restraining portion of FIG. 9.

In FIGS. 9 and 10, the shutter charge interlocking mechanism from the motor 1 to the one-way clutches 10–14, 10'–14' shown in FIG. 1 and the reduction gear train 57 and subsequent film advancing mechanism are entirely similar to those in the first embodiment and therefore need not be described.

A rearward blade driving lever 228 supports the rearward blade 25 and is rotatably supported on the shaft 21, and the projection 228b thereof is formed with a first restraining portion $228b_1$ and a second restraining portion $228b_2$ (the right side surface of the projection 228b), as shown in FIG. 10. A rearward blade locking lever 236 is engaged with the first restraining portion $228b_1$. Accordingly, clockwise rotation of the rearward blade driving lever 228 by the spring 32 is blocked by the rearward blade locking lever 236, and the rearward blade 25 is held in an intermediate position wherein it covers only a part of the aperture 24, by the rearward blade driving lever 228. The forward blade 26 fully covers the aperture 24.

The rearward blade locking lever 236 comprises a first locking lever 236A and a second locking lever 236B pivotably supported on the shaft 37, the two locking levers being coupled to each other by a torsion spring 236c wound on the shaft 37. The first locking lever 236A is biased counter-clockwisely by the spring 236c, and the second locking lever 236B is biased clockwise by the spring 236c through a pin 236D. The first restraining portion 228$b_1$ of the rearward blade driving lever 228 is engaged with one end of the first locking lever 236A. An armature 40 is provided on one end of the second locking lever 236B and is attracted to the rearward blade restraining magnet 41 against the biasing force of the tension spring 38. A plate spring 235 capable of bearing against a pin 286 is secured to the other end of the second locking lever 236B. The pin 286 is studded in the arm 284b of a bell crank 284 supported on the shaft 21.

The free end of the arm 284a of the bell crank 284, as shown in FIGS. 9 and 10, is connected through an auxiliary connecting rod 285 to the free end of the pivotable arm 20' for rotating the forward blade driving lever 44 counter-clockwise, and the other arm 284b of the bell crank 284 is formed so as to bear against the pin 31 studded in the rearward blade driving lever 228, in the course of the counter-clockwise rotation thereof, and a pin 286 capable of bearing against the plate spring 235 is studded on the free end of the arm 284b.

When the release button is depressed, the motor is driven and the pivotable arm 20 rotates counter-clockwisely about the shaft 21 through the one-way clutches 10-14, etc. and, when the crank arm 16 passes through its bottom dead center position, the pivotable arm 20 rotates clockwisely. In the course of its counter-clockwise rotation, the pivotable arm 20 bears against the pin 31 and rotates the rearward blade driving lever 228 counter-clockwisely about the shaft 21 through the pin 31 and retracts the rearward blade from the aperture 24 while, at the same time, it charges the driving spring 32. By the rotation of the rearward blade driving lever 228, the first restraining portion 228$b_1$ is displaced leftwardly as viewed in FIG. 10 and becomes disengaged from the tip end of the arm 236A$_1$ of the first locking lever 236A and, when the second restraining portion 228$b_2$ reaches said tip end, the first locking lever 236A is rotated counter-clockwisely about the shaft 37 by the biasing force of the torsion spring 236c and comes into engagement with the second restraining portion 228$b_2$. When the crank arm 16 passes through its bottom dead center position and the pivotable arm 20 rotates clockwisely, the first locking lever 236A blocks the clockwise rotation of the rearward blade driving lever 228 caused by the biasing force of the rearward blade driving spring 32 and holds the rearward blade 25 at a position retracted from the aperture 24.

When the crank arm 16 rotates through approximately 360° and the pin 17 reaches the vicinity of its top dead center position, the motor is stopped as in the first embodiment, the forward blade restraining magnet 55 is electrically energized, the restraint of the forward blade driving lever 44 by the forward blade locking lever 50 is released and the forward blade 25 is retracted from the aperture 24 and uncovers the aperture, whereby exposure is effected. After a predetermined time delay, the rearward blade restraining magnet 41 is electrically energized and the second locking lever 236B of the rearward blade locking lever 236 is rotated clockwisely about the shaft 37 by the biasing force of the tension spring 38 until the plate spring 235 bears against the pin 286 of the bell crank 284. Due to this rotation of the second locking lever 236B, the first locking lever is rotated clockwisely by the pin 236D and therefore, the rearward blade driving lever 228 has its restraint released and is rotated clockwisely about the shaft 21 by the biasing force of the rearward blade driving spring 32 until it bears against the stopper 33. Thus, the rearward blade 25 closes the aperture 24 and the exposure is terminated.

At the end of the clockwise rotation of the rearward blade driving lever 228, the rearward blade auxiliary lever 29 closes the switch 42 (see FIG. 2) as in the first embodiment, thereby driving the motor in reverse direction. This reverse revolution of the motor rotates the crank arm 16' clockwisely through the one-way clutches 10'-14' and the shaft 15'. The forward blade driving lever 44 is rotated counter-clockwisely by the counter-clockwise rotation of the pivotable arm 20' caused by the 180° rotation of the crank arm 16' from its top dead center position to its bottom dead center position, and fully closes the aperture 24 by the forward blade 26 as shown in FIG. 9 and also charges the driving spring 47. At the same time, the forward blade locking lever 50 is rotated counter-clockwisely through the plate spring 53 and restrains the forward blade driving lever 44 and also is attracted to the forward blade restraining magnet 55. Accordingly, the forward blade 26 is held in the fully closing position for the aperture 24.

By the counter-clockwise rotation of the pivotable arm 20', the bell crank 284 is rotated counter-clockwisely about the shaft 21 through the connecting rod 285 and bears against the pin 31 in the course of the rotation, and rotates the rearward blade driving lever 228 against the biasing force of the rearward blade driving spring 32 and also bears against the plate spring 235 through the pin 286, thus rotating the rearward blade locking lever 236 counter-clockwisely against the biasing force of the tension spring 38. Accordingly, the second locking lever 236B of the rearward blade locking lever 236 is attracted to the rearward blade restraining magnet 41 and at the same time, the first restraining portion 228$b_1$ of the rearward blade driving lever 228 is restrained by the first locking lever 236A, and the rearward blade 25 is restrained in a state in which it does not cover the lower portion of the aperture 24.

The crank arm 16' rotates through 180° and further rotates through 180° to rotate the bell crank 284 clockwisely with the pivotable arm 20' and returns to its original position shown in FIG. 9. Thereafter, as in the first embodiment, the crank arm 16' further makes two full rotations while the film advancing mechanism operates, and the pivotable arm 20' and the bell crank 284 make two reciprocations and return to their original positions shown in FIG. 9 and thus, the preparation for photography is completed.

Figure 11:
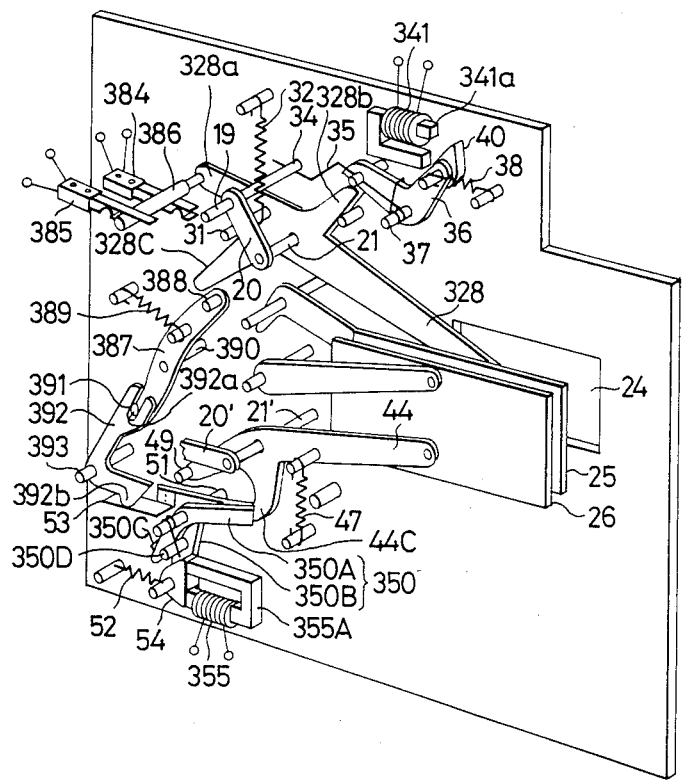
FIG. 11 is a perspective view of a fourth embodiment of the present invention.

FIG. 11 is a cross-sectional view showing a fourth embodiment in which the magnet for restraining the movement of the light-intercepting blade has been changed from a so-called combination magnet comprising a combination of a permanent magnet and an electromagnet as shown in each of the aforedescribed embodiments to an electromagnet which exhibits an attraction only when electrically energized. In FIG. 11, the shutter charge interlocking mechanism from the motor through the one-way clutches to the pivotable arms 20, 20' of the four-articulation link mechanism and the reduction gear train 57 and subsequent film advancing mechanism are entirely similar to those in FIG. 1 and therefore, these are not shown for simplicity of illustration.

In FIG. 11 which shows the state after completion of the preparation for photography and before the release operation, when the pivotable lever 20 is rotated counter-clockwisely about the shaft 21, this pivotable lever 20 rotates a rearward blade driving lever 328 through the pin 31 as in the first embodiment and charges the rearward blade driving spring 32 and also rotates the rearward blade locking lever 36 counter-clockwisely about the shaft 37 through the pin 34 and the torsion spring 35. By this counter-clockwise rotation of the rearward blade locking lever 36, the projection 328b of the rearward blade driving lever 328 is restrained and the armature 40 is urged against the yoke 341a of the rearward blade restraining electromagnet 341.

The rearward blade driving lever 328 has two arms 328a and 328c, the arm 328a having studded therein a pin 31 and an insulating pin 386 for closing and opening a first leaf switch 384 and a second leaf switch 385. The other arm 328c bears against a pin 388 studded on one end of an intermediate lever 387, at the end of the counter-clockwise rotation of the rearward blade driving lever 328, and rotates the intermediate lever 387 clockwisely about a shaft 390 against the biasing force of a tension spring 389. A pin 391 is studded on the other end of the intermediate lever 387 and is engaged with a slot 392a formed at one end of a bell crank 392. The other end 392b of the bell crank 392 pivotably supported by a shaft 393 is engaged with the plate spring 53 secured to the second locking lever 350B of a locking lever 350.

On the other hand, the forward blade driving lever 44 is restrained by the forward blade locking lever 350. This forward blade locking lever 350 comprises a first locking lever 350A and a second locking lever 350B both pivotably supported on the shaft 51, the two locking levers being coupled to each other by a torsion spring 350C wound on the shaft 51. The first locking lever 350A is biased counter-clockwisely by the torsion spring 350C, and the second locking lever 350B is biased clockwisely by the torsion spring 350C through a pin 350D. The clockwise rotation of the forward blade driving lever 44 by the forward blade driving spring 47 is blocked by the first locking lever 350A and the forward blade 26 is held in a position wherein it covers the entire aperture 24. The second locking lever 350B is provided with a plate spring 53 and an armature 54. Since the second locking lever 350B is biased counter-clockwisely by a tension spring 389 through the intermediate lever 387, the bell crank 392 and the plate spring 53, the armature 54 is normally urged against the yoke 355A of a forward blade restraining electromagnet 355 against the biasing force of the tension spring 52.

At the end of the counter-clockwise rotation of the pivotable arm 20, namely, when the rearward blade 25 has been moved to a position retracted from the aperture 24, a first switch 384 engaged with the insulating pin 386 is closed to electrically energize the rearward blade restraining electromagnet 341 to cause the armature 40 to be attracted to the yoke 341a. During the time from after the rearward blade driving lever 328 has been rotated counter-clockwisely until the arm 328c thereof bears against the pin of the intermediate lever 388, that is, before the bell crank 392 rotates counter-clockwisely, a second switch 385 is closed to electrically energize the forward blade restraining electromagnet 355, to cause the armature 54 to be attracted to the yoke 355A.

The operation of the fourth embodiment will now be described. When a release button, not shown, is depressed, the motor revolves as in the first embodiment and the pivotable arm 20 is rotated counter-clockwisely. By this rotation of the pivotable arm 20, the rearward blade driving lever 328 is rotated counter-clockwisely to retract the rearward blade 25 upwardly from the aperture 24 and also charge the driving spring 32. At the same time, the torsion spring 35 is pressed and biased by the pin 34 and the rearward blade locking lever 36 rotates counter-clockwisely about the shaft 37 against the biasing force of the tension spring 38 to restrain the projection 328b of the rearward blade driving lever 328 and also urge the armature 40 against the yoke 341a of the rearward blade restraining electromagnet 341. Simultaneously therewith or a little before, the insulating pin 386 causes the first switch 384 to be closed and therefore, the rearward blade restraining electromagnet 341 is electrically energized, whereby the armature 40 is attracted.

When the rearward blade driving lever 328 starts to rotate counter-clockwisely, as described above, the insulating pin 386 closes the second switch 385, which in turn electrically energizes the forward blade restraining electromagnet 355 to cause the armature 54 to be attracted to the yoke 355A. When the rearward blade driving lever 328 further rotates counter-clockwisely, the arm 328c bears against the pin 388 to rotate the intermediate lever 387 clockwisely against the biasing force of the tension spring 389. In response to this rotation of the intermediate lever 387, the bell crank 392 rotates counter-clockwisely and the end 392b thereof becomes disengaged from the plate spring 53.

As soon as or slightly before the pivotable arm 20 rotates clockwisely back to its original position, the supply of power to the forward blade restraining electromagnet 355 is cut off. Thus, the forward blade locking lever 350 is rotated clockwisely by the biasing force of the tension spring 52 to release the restraint of the forward blade driving lever 44. Accordingly, the forward blade driving lever 44 is rotated clockwisely by the biasing force of the forward blade driving spring 47 to retract the forward blade 26 from the aperture 24, whereby exposure is effected. Further, after a predetermined time delay subsequent to the supply of power to the forward blade restraining electromagnet 355, the supply of power to the rearward blade restraining electromagnet 341 is cut off, and the rearward blade locking lever 36 is rotated clockwisely by the biasing force of the tension spring 38, thereby releasing the restraint of the rearward blade driving lever 328. Accordingly, the rearward blade driving lever 328 is rotated clockwisely by the biasing force of the rearward blade driving spring 32 to move the rearward blade 25 to a light-intercepting position, thus terminating the exposure.

When the rearward blade driving lever 328 rotates clockwisely, the insulating pin 386 causes the first switch 384 and the second switch 385 to be opened while, at the same time, the engagement between the arm 328c and the pin 388 of the intermediate lever 387 is released. Accordingly, the intermediate lever 387 is rotated counter-clockwisely by the biasing force of the tension spring 389 to rotate the second locking lever 350B counter-clockwisely through the bell crank 392 and the plate spring 53 and urge the armature 54 against the yoke 355A of the forward blade restraining electromagnet 355 against the biasing force of the tension spring 52. In this state, however, the first locking lever 350A bears against the lower end surface of the projection 44c of the forward blade driving lever 44 which still remains rotated clockwisely, whereby the counter-clockwise rotation thereof is blocked and the coil torsion spring 350c remains charged.

When the exposure is completed, the motor revolves in reverse direction just in the same manner as in the first embodiment and the pivotable arm 20' is rotated counter-clockwisely to rotate the forward blade driving lever 44 counter-clockwisely through the pin 49 and charge the driving spring 47. When the forward blade driving lever 44 has been rotated to a position in which the forward blade 26 covers the aperture 24, the first locking lever 350A is rotated counter-clockwisely by the biasing force of the coil torsion spring 350C until it bears against the pin 350D, thus restraining the projection 44c as shown in FIG. 11. Thereafter, film advance is further effected just as in the first embodiment.

In the fourth embodiment, the magnet for restraining the rearward blade and the forward blade is a small and inexpensive electromagnet, and this leads to the saving of the space and a reduction in cost. Also, in the fourth embodiment, the forward blade locking lever 350 is designed to be moved in association with the movement of the rearward blade driving lever 328. Accordingly, if design is made such that when the rearward blade 25 has retracted from the aperture 24, the arm 328c of the rearward blade locking lever 328 bears against the pin 388 of the intermediate lever 387 and the first locking lever 350A of the forward blade locking lever rotates clockwisely to release its engagement with the forward blade driving lever 44, the forward blade restraining electromagnet 355 and the armature 54 may be eliminated.

Figure 12:
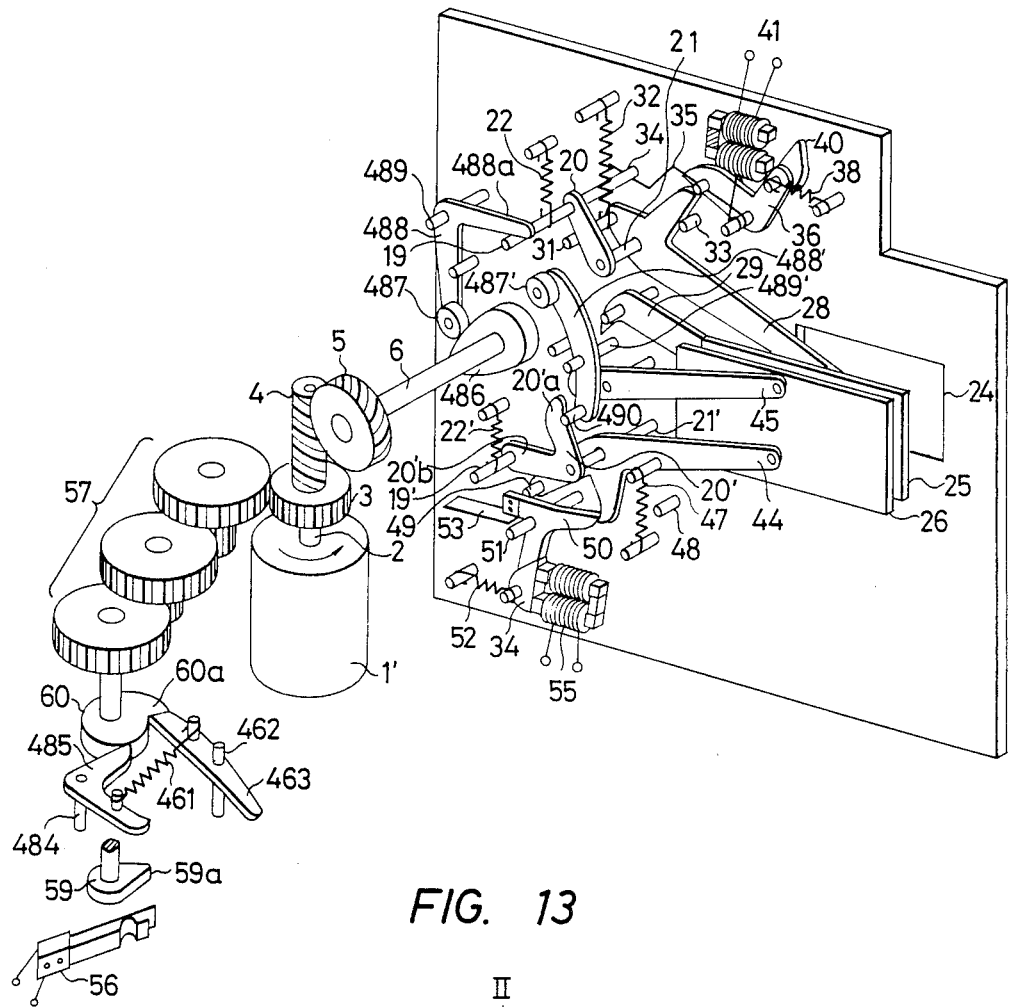
FIG. 12 is a perspective view of a fifth embodiment of the present invention.

FIG. 12 is a perspective view showing a fifth embodiment of the present invention. This embodiment, unlike the above-described first to fourth embodiments, is designed such that the charging of the forward and rearward blades is accomplished only by the revolution of the motor in one direction.

FIG. 12 shows the state after completion of the preparation for photography and before the release operation. When a release button, not shown, is depressed, power is supplied to the motor 1'. At the same time, a restraining pawl 463 engaged with the pawl portion 60a of the pawl plate 60 provided at the end of the reduction gear train 57 rotates clockwisely about a shaft 462 against the biasing force of a tension spring 461 in response to the depression of the release button, thereby releasing the restraint of the pawl plate 60. Accordingly, when the release button is depressed, the driving shaft 2 of the motor 1' is rotated in counter-clockwise direction (the direction of arrow) and rotates the pawl plate 60 clockwisely through the gear 3 and the reduction gear train 57 and at the same time, rotates the shaft 6 clockwisely through the worm 4 and the gear 5. The gear ratio of each interlocking mechanism is set so that when the pawl plate 60 makes one full rotation, the shaft 6 also makes one full rotation. When the pawl plate 60 rotates clockwisely through 90° from its position shown in FIG. 12, the pawl portion 60a becomes engaged with a pawl lever 485 biased counter-clockwisely about a shaft 484 by the tension spring 461 and is restrained thereby. This pawl lever 485 rotates clockwisely against the biasing force of the tension spring 461 to release the restraint of the pawl plate 60 in response to the clockwise rotation of the forward blade auxiliary lever 45 and returns to its shown position when the forward blade auxiliary lever 45 is rotated counter-clockwisely.

Figure 13:
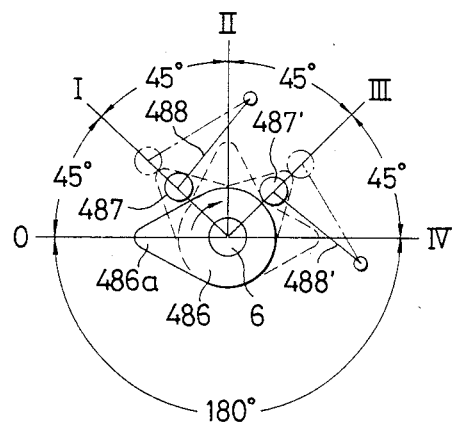
FIG. 13 illustrates the relation between the cam and the follower in FIG. 12.

A cam plate 486 is secured to the driving shaft 6, and two rollers 487 and 487' which follow the movement of the cam plate 486 while being in contact with the cam surface of this cam plate are provided on one end of follower levers 488 and 488'. The two rollers 487 and 487' are provided at positions spaced apart from each other by 90° about the shaft 6, as shown in FIG. 13. When the cam plate 486 reaches a position I in which it has been rotated clockwisely through 45° from its position indicated by solid line in FIGS. 12 and 13, the roller 487 rotates clockwisely about a shaft 489 with the follower lever 488 and rides onto a cam crest 486a, as indicated by dotted line. When the cam crest 486a further rotates to a position II shown in FIG. 13, the roller 487 and the follower lever 488 rotate counter-clockwisely and return to their original positions. Thus, when the cam plate 486 rotates through 90°, the pawl plate 60 also rotates through 90° and is restrained by the pawl lever 485. Accordingly, the rotation of the driving shaft 2 of the motor 1' is temporally blocked and the follower lever 488 stops at its original position.

When the follower lever 488 rotates clockwisely, one arm 488a thereof bears against the pin 19 of the pivotable arm 20 to rotate the pivotable arm 20 counter-clockwisely against the biasing force of the tension spring 22. Accordingly, as in the first embodiment, the pivotable arm 20 retracts the rearward blade 25 upwardly from the aperture 24 through the pin 31 and the rearward blade driving lever 28. At the same time, the pivotable arm 20 rotates the rearward blade locking lever 36 counter-clockwisely through the pin 34 and the torsion spring 35, restrains the rearward blade driving lever 28 and also causes the armature 40 to be attracted to the rearward blade restraining magnet 41.

When the follower lever 488 rotates counter-clockwisely and returns to its original position, the pivotable arm 20 is rotated clockwisely by the biasing force of the tension spring 22 and returns to its original position. Also, when the cam plate 486 rotates through 90°, the cam 59 provided coaxially with the pawl plate 60 also rotates through 90° to close the switch 56. By the closing of this switch 56, the motor 1' is electrically deenergized and stopped while, at the same time, the forward blade restraining magnet 55 is electrically energized and the forward blade locking lever 50 is rotated clockwisely by the biasing force of the tension spring 52, thereby releasing the restraint of the forward blade driving lever 44. Accordingly, the forward blade driving lever 44 is rotated clockwisely by the biasing force of the forward blade driving spring 47 and retracts the forward blade 26 from the aperture 24, whereby exposure is effected.

At the end of the rotation of the forward blade auxiliary lever 45 resulting from the clockwise rotation of the forward blade driving lever 44, the pawl lever 485 rotates clockwisely in response to the forward blade auxiliary lever 45 to thereby release the restraint of the pawl 60a of the pawl plate 60.

After a predetermined time delay from the supply of power to the forward blade restraining magnet 55, the rearward blade restraining magnet 41 is electrically energized as in the first embodiment, and the rearward blade locking lever 36 releases the restraint of the rearward blade driving lever 28 to move the rearward blade 25 downwardly to fully close the aperture 24.

At the end of the movement of the rearward blade 25, a switch, not shown, like the switch 42 of FIG. 2, is closed by the rearward blade auxiliary lever 29 to permit power to be supplied to the motor 1', thereby causing the motor to revolve again in the same direction (the direction of arrow indicated in FIG. 12).

Since the restraint of the pawl plate 60 has already been released, the driving shaft 2 of the motor 1' again rotates counter-clockwisely and the cam plate 486 again starts to rotate clockwisely. By this rotation, the cam plate 486 rotates to a position III displaced by 45° from the position II of FIG. 13 and, in accordance with this rotation of the cam plate 486, the follower lever 488' and the roller 487' rotate clockwisely about a support shaft 489'. The rotation of the follower lever 488' is transmitted to the pivotable arm 20' through a pin 490 studded on the other end of the follower lever 488'.

When the follower lever 488' rotates clockwisely, the pivotable arm 20' rotates counter-clockwisely against the biasing force of the tension spring 22' to thereby rotate the forward blade driving lever 44 counter-clockwisely through the pin 490 and raise the forward blade 26 from its non-light-intercepting position and dually cover the aperture 24 with the rearward blade 25 and also charge the driving spring 47. The above-mentioned counter-clockwise rotation of the arm 20' rotates the forward blade locking lever 50 counter-clockwisely through the plate pin 19' and the plate spring 53 to thereby cause the forward blade driving lever 44 to be restrained to fix the forward blade 26 in its light-intercepting position and at the same time, displaces the armature 54 against the biasing force of the tension spring 52 to thereby cause the armature to be attracted to the forward blade restraining magnet 55. At this time, in response to the forward blade auxiliary lever 45 rotated counter-clockwisely with the forward blade driving lever 44, the pawl lever 485 is returned to its shown position by the biasing force of the tension spring 461. Subsequently, the cam plate 486 further rotates through 45° and, when it is displaced from the position III of FIG. 13 to the position IV, the follower lever 488' is rotated counter-clockwisely by the biasing force of the tension spring 22' and returns to its original position.

When the cam plate 486 reaches its original position O by rotating through 180° after having reached the position IV of FIG. 13, the pawl plate 60 also makes one full rotation and the pawl portion 60a thereof is engaged by a restraining pawl 463 and therefore, the driving shaft of the motor 1 is stopped. Film advance is effected during the 180° rotation of the cam plate 486 from its position IV to its original position O, and at the end of such rotation, the supply of power to the motor 1' is cut off and thus, the preparation for photography is completed.

Figure 14:
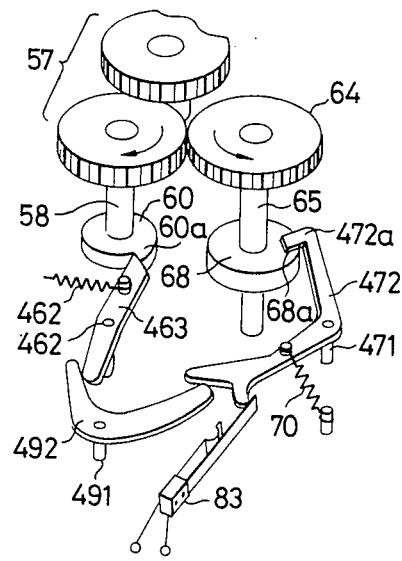
FIG. 14 is a perspective view of the film transporting portion in FIG. 12.

Referring to FIG. 14, a cut-away disc 68 is secured to the shaft of the gear 64. The tip end 472a of a limiting lever 472 biased counter-clockwisely about a shaft 471 by the tension spring 70 is engaged with a groove 68a formed in the cut-away disc 68. The other end of the limiting lever 472 is connected to a restraining pawl 463 through an intermediate lever 492 pivotably supported by a shaft 491, and also holds the switch 83 in OFF position. When the release button is depressed and the restraining pawl 463 operatively associated therewith is rotated clockwisely against the biasing force of the tension spring 461, the restraint of the pawl plate 60 is released and at the same time, the restraining pawl 463 rotates the limiting lever 472 clockwisely against the biasing force of the tension spring 70 through an intermediate lever 492. Accordingly, the tip end 472a of the limiting lever 472 comes out of engagement with the groove 68a of the cut-away disc 68 to release the restraint of the cut-away disc 68 and at the same time, close the switch 83 and thus, permits power to be supplied to the motor 1'.

When the driving shaft 2 starts to rotate, the pawl plate 60 is immediately rotated clockwisely and at the same time, the cut-away disc 68 is rotated counter-clockwisely. Accordingly, even if the finger is released from the release button thereafter, the restraining pawl 463 does not restrain the pawl plate 60 but is brought into engagement with the peripheral surface of the pawl portion 60a by the biasing force of the tension spring 461, and the tip end 472a of the limiting lever 472 comes into contact with the outer peripheral surface of the cut-away disc 68, whereby counter-clockwise rotation thereof is blocked. Accordingly, the switch 83 remains in its ON state and, when the cut-away disc 68 makes one full rotation and the tip end 472a of the limiting lever 472 is received in the groove 68a, the switch 83 is opened to stop the supply of power to the motor 1'. At the same time, the restraining pawl 463 comes into engagement with the pawl portion 60a of the pawl plate 60, so that the pawl plate 60 is prevented from rotating and the driving shaft 2 operatively associated therewith is stopped from rotating and thus, the preparation for photography is completed.

In any of the first to fourth embodiments shown in FIGS. 1 to 11, a crank-pivotable arm mechanism (16, 17, 18, 19, 20, 21 or 16', 17', 18', 19', 20', 21') using a four-articulation link is used as the shutter charging mechanism and therefore, shutter charge is effected only in the range of one-half of one full rotation of the shaft 15, 15' and accordingly, as a matter of course, the load torque applied to the motor 1 is great.

On the other hand, in the fifth embodiment shown in FIG. 12, shutter charge is effected by the use of the cam 486 and therefore, the previously noted problem can be avoided, but it is necessary to start the motor with the restraining pawl 463 and pawl lever 485 for positively stopping the motor 1 revolving in one direction being successively retracted from the pawl plate 60, and the restraining and retracting operations of this pawl must be mechanically effected by other member biased by a spring or the like and therefore, as compared with the first to fourth embodiments, the fifth embodiment is poor in reliability.

Figure 15:
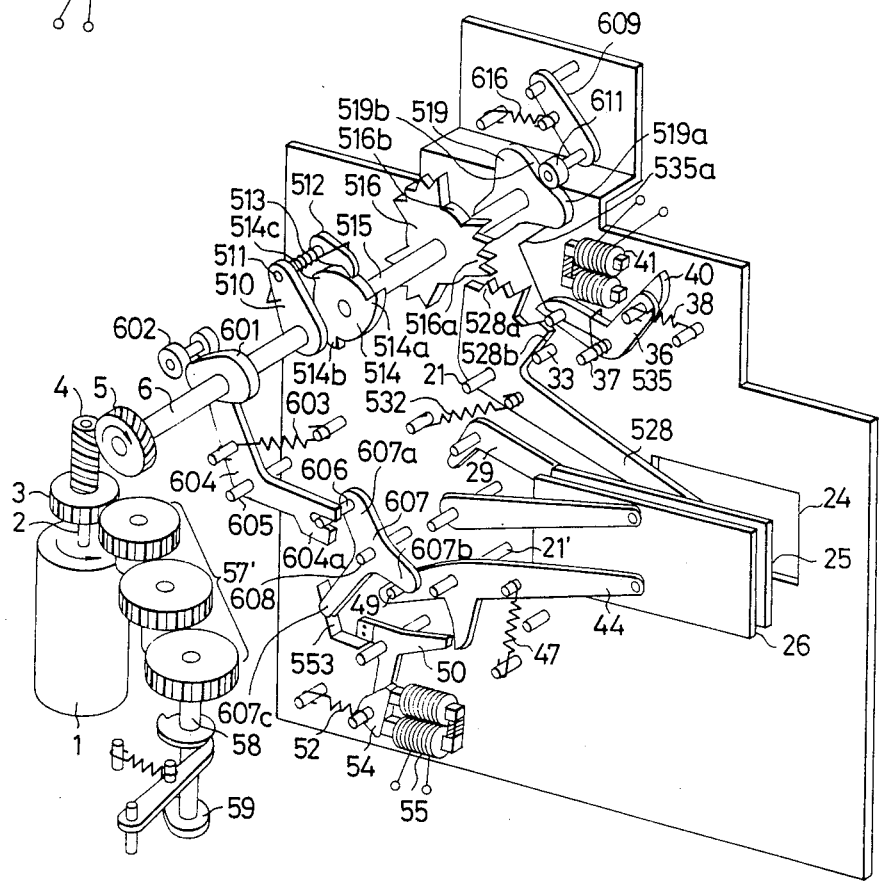
FIGS. 15 and 16 are perspective views showing a sixth embodiment of the present invention and a modification thereof, respectively.

Thus, in a sixth embodiment shown in FIG. 15, it is intended to revolve the motor 1 in forward and reverse directions and effect shutter charge at a low load torque while keeping the reliability of the operation. FIG. 15, like FIG. 1, shows the state after completion of the preparation for photography and immediately before the release, and in this state, both the forward blade 26 and the rearward blade 25 are effecting light interception by dually covering the aperture 24.

When a release button, not shown, is depressed, power is supplied to the motor 1 and the driving shaft 2 thereof is rotated counter-clockwisely to rotate the shaft 6 clockwisely through the worm 4 and the gear 5. An arm 510 is secured to one end of the shaft 6. A feed pawl 512 is rotatably supported on the free end of the arm 510 by a pin 511 and is normally biased clockwisely by a torsion spring 513. The tip end of the feed pawl 512 is engageable with a ratchet wheel 514 secured to one end of a shaft 515 provided on the extension of the shaft 6. The ratchet wheel 514 is formed with three pawl portions 514a, 514b and 514c at positions trisecting the circumference thereof, and when the arm 510 has rotated clockwisely through 60° from its position of FIG.

15, the tip end of the feed pawl 512 meshes with the pawl portion 514a and the ratchet wheel 514 starts to rotate clockwise with the arm 510.

A cut-away gear 516 is provided on the intermediate portion of the shaft 515 and has three segment-like toothed portions 516a and three cut-away portions 516b disposed at equal intervals.

When the cut-away gear 516 is slightly rotated clockwisely, one of the toothed portions 516a meshes with a segment gear portion 528a formed on one end of a rearward blade driving lever 528 and, by clockwise rotation of the cut-away gear 516, the rearward blade driving lever 528 is rotated counter-clockwisely to move the rearward blade 25 upwardly of the aperture 24 and also charge a driving spring 532. Thereafter, the lever 528 is restrained by the locking lever 36.

When the arm 510 rotates clockwisely through 180° after the motor 1 has been started, the ratchet wheel 514 rotates clockwisely through 120° and the shaft 515 and the cut-away gear 516 also rotate through 120°. During this 120° rotation, the motor 1 is controlled through the reduction gear train 57' as in the embodiment of FIG. 1 and is stopped from revolving. However, the reduction gear ratio of the reduction gear train 75' in this embodiment differs from that in the embodiment of FIG. 1, and the rotation ratio between the terminal shaft 58 thereof and the shutter charging shaft 6 is set to 1:1.

In the position shown in FIG. 15, the rearward blade locking lever 36 is not attracted to the rearward blade restraining magnet 41 through the armature 40 and therefore, cannot restrain the restraining portion 528b of the rearward blade driving lever 528. However, elongated one end 535a of a coil torsion spring 535 provided on the rearward blade locking lever 36 is urged downwardly by rotation of a cam plate 519 secured to the other end of the shaft 515 and therefore, the rearward blade locking lever 36 is rotated counter-clockwisely about the shaft 37 and restrains the restraining portion 528b of the rearward blade driving lever 528 and also causes the armature to be attracted to the rearward blade restraining magnet 40. The cam plate 519 comprises three protrusions 519a and three valleys 519b trisecting the circumference thereof and, when the motor 1 is stopped, a roller 611 is received in one of the valleys 519b, whereby the circumferential stopped positions of the ratchet wheel 514, the cut-away gear 516 and the cam plate 519 about the shaft 515 are determined.

On the other hand, a forward blade charging cam plate 601 is provided on the intermediate portion of the driving shaft 6, and a roller 602 which is in rolling contact with the cam surface of the cam plate 601 is provided on one end of a follower lever 604 biased clockwisely about a shaft 605 by a tension spring 603. A fork 604a is formed on the other end of the follower lever 604 and is coupled to an intermediate lever 607 through a pin 606. The intermediate lever 607 is pivotably supported by a shaft 608 and has three arms 607a, 607b and 607c. The pin 606 is studded in the first arm 607a, the second arm 607b is engaged with the pin 49 of the forward blade driving lever 44, and the third arm 607c is engaged with a plate spring 553 secured to the forward blade locking lever 50.

While the cam plate 601 rotates clockwisely through 180° with the shaft 6, the roller 602 bearing against the cam plate 601 and the lever 604 are rotated clockwisely about the shaft 605 by the biasing force of a tension spring 663 while following the movement of the cam plate 601, and rotate the intermediate lever 607 counter-clockwisely about the shaft 608 through the fork 604a and the pin 606. At that time, the forward blade driving lever 44 is restrained by the forward blade locking lever 50 and therefore, the forward blade 26 covers the aperture 24 and stays in the position of FIG. 15.

In the state wherein, as described above, the shaft 6 has been rotated clockwisely through 180° and the rearward blade 25 is retracted upwardly from the aperture 24 and the intermediate lever 607 is sufficiently spaced apart from the pin 49 of the forward blade driving lever 44 and the plate spring 553 of the forward blade locking lever 50, when suitable switch means such as, for example, the switch 56 in FIG. 1 is closed by the cam 59 to permit power to be supplied to the forward blade restraining combination magnet 55, the forward blade locking lever 50 is rotated by the biasing force of the tension spring 52 to release the restraint of the forward blade driving lever 44. Accordingly, the forward blade driving lever 44 is rotated by the biasing force of the forward blade driving spring 47 and the forward blade 26 uncovers the aperture 24.

When the rearward blade restraining combination magnet 41 is electrically energized after a predetermined time delay from the electrical energization of the forward blade restraining magnet 55, the rearward blade locking lever 36 is rotated by the biasing force of the tension spring 38 to release the restraint of the rearward blade driving lever 528. Accordingly, the rearward blade driving lever 528 is rotated by the biasing force of the rearward blade driving spring 532 and the rearward blade 25 closes the aperture 24.

At the end of this rotation of the rearward blade driving lever 528, the rearward blade auxiliary lever 29 closes the switch 42 (see FIG. 2) to thereby revolve the motor 1 in reverse direction. The reverse revolution of the motor 1 rotates the cam plate 601 counter-clockwisely and rotates the forward blade driving lever 44 counter-clockwisely through the roller 602, the follower lever 604 and the intermediate lever 607, and the forward blade 26 returns to the position of FIG. 1 in which, with the rearward blade 25, it dually covers the aperture 24. Also, the third arm 607c of the intermediate lever 607 presses the plate spring 553 and therefore, the locking lever 50 rotates counter-clockwisely and the armature 54 is attracted to the forward blade restraining magnet 55 and restrains the forward blade driving lever 44.

This reverse revolution of the motor is ideally not transmitted to the shaft 515 due to the presence of the one-way clutch mechanism 510-514. Actually, however, the shaft 515 may rotate counter-clockwisely due to the friction between the feed pawl 512 and the ratchet wheel 514. Therefore, to prevent such inadvertent rotation, a click lever 609 biased by a spring 610 is provided near the cam 519 and a roller 611 provided on the free end of the click lever 609 is received in the valley 519b of the cam 519 to hold down this valley 519b.

After the motor 1 starts reverse revolution and the shaft 6 is rotated counter-clockwisely through 180° as described above, the shaft 6 further makes one full rotation and in the meantime, it drives the film advancing mechanism through the reduction gear train 57' to thereby feed the film by an amount corresponding to one frame.

As described above, in the sixth embodiment, shutter charge is effected through the cam plate 601 secured to the shaft 6 and rearward blade charge is effected through the one-way clutch 510–514 having a ratchet wheel having three pawl portions. That is, 180° clockwise rotation of the shaft 6 opens the path of the pin 49 of the forward blade driving lever 44 rotated when the shutter is opened, moves the rearward blade 25 to its non-light-intercepting position, charges the rearward blade driving spring 532 and opens a path along which the toothed portion 528a of the rearward blade driving lever 528 rotated when the shutter is closed, and the reverse rotation of the shaft 6 after completion of the exposure operation moves the forward blade 26 to its light-intercepting position and charges the forward blade driving spring 47. Accordingly, the reliability of the operation is high and the drive force of the motor can be effectively utilized for shutter charge and moreover, the load torque is low and thus, the motor can be made compact.

Figure 16:
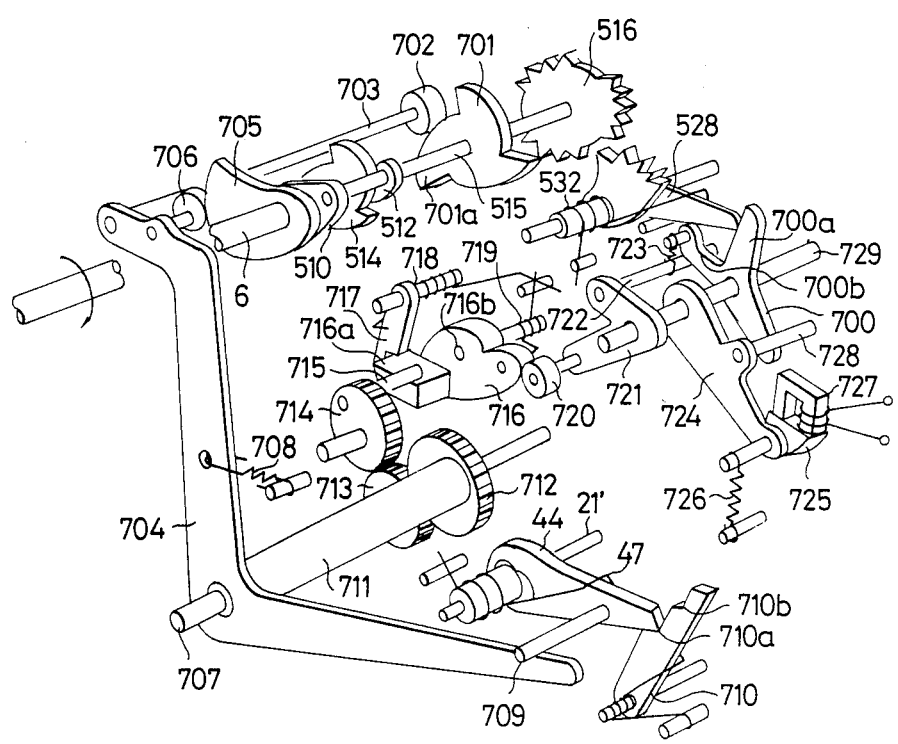

FIG. 16 shows a modification of the sixth embodiment shown in FIG. 15. In FIG. 16, members similar to those of FIG. 15 are given similar reference numerals and for simplicity of illustration, the forward blade, the rearward blade, etc. are not shown.

In FIG. 16, when the driving shaft 6 is rotated clockwisely through 180° from its shown position as indicated by arrow by the revolution of the motor in response to release operation, the rearward blade charging shaft 515 secured to the ratchet wheel 514 is rotated in the same direction through 120° through the one-way clutch mechanism 510, 512, 514. This 120° rotation rotates the rearward blade driving lever 528 counter-clockwisely through the cut-away gear 516 to move the rearward blade to its non-light-intercepting position and at the same time, charge the rearward blade driving spring 532 shown here as a coil spring. This driving lever 528 is restrained by the restraining arm 700a of a locking lever 700 biased counter-clockwisely when the rearward blade is brought to its non-light-intercepting position.

A cam plate 701 is secured to the rearward blade charging shaft 515 and has three protrusions 701a spaced apart from one another by 120°. A roller 702 mounted on a forward blade charging lever 704 by means of a rod 703 bears against the cam plate 701. A cam plate 705 is secured to the driving shaft 6, and a roller 706 provided on the forward blade charging lever 704 bears against the cam plate 705. The relation between the cam plates 701, 705 and the charging lever 704 is determined as follows. While the driving shaft 6 rotates clockwisely through 180° as described above, the charging lever 704, at the relatively early stage of the rotation, rotates counter-clockwisely about a shaft 707 by a slight amount against the force of a spring 708 due to the engagement between the protrusion 701a of the cam plate 701 and the roller 702, whereafter it rotates clockwisely by a relatively great amount due to the engagement between the roller 706 and the portion of the cam plate 705 in which the amount of lift is small. The above-mentioned slight counter-clockwise rotation of the charging lever 704 rotates the forward blade driving lever 44, so far restrained by the first restraining portion 710a of a locking lever 710 biased counter-clockwisely, slightly counter-clockwisely about the shaft 21', and also charges the rearward blade driving spring 47 shown here as a coil spring. The locking lever 710 restrains the driving lever 44 by a second restraining portion 710b thereof. The slight counter-clockwise rotation of the driving lever 44 moves the forward blade having so far covered the remainder of the shutter aperture except the upper end portion thereof, so as to cover all of the aperture. A gear train 712, 713, 714 is connected to the charging lever 704 through a shaft 711. A stopper pin 715 is secured to the last gear 714 and is positioned in the orbit of rotation of the projection 716a of a control member 716. When the driving shaft 6 has rotated through 180° as described above, the stopper pin 715 becomes spaced apart from the projection 716a of the control member 716 so as to permit a necessary amount of rotation of the projection 716a.

When the driving shaft 6 rotates through 180° as described above to bring the rearward blade to its non-light-intercepting position, a control member locking lever 717 is rotated against the force of a spring 718 in response to the rearward blade driving lever 528, for example, thereby releasing the restraint of the projection 716a of the control member. Upon this release, the control member 716 is rotated clockwisely about a shaft 716b by the force of a spring 719 and strikes against the stopper pin 715 and is stopped thereby. In the course of its rotation, the control member 716 actuates the switch of an electric shutter circuit, not shown, and starts the counting of exposure time, and also rotates the forward blade locking lever 710 clockwisely by an interlocking mechanism, not shown, to thereby release the restraint of the forward blade driving lever 44. Thus, the driving lever 44 rotates clockwisely to retract the forward blade from the shutter aperture and start exposure.

A roller 720 secured to a reset lever 721 bears against the control member 716, and a pin 722 is secured to the lever 721. This pin 722 is capable of bearing against the arm 700b of the rearward blade locking lever 700, and a spring 723 is mounted between the pin 722 and the arm 700b so as to bring these two close to each other. A lever 724 has an armature 725 at one end thereof and is biased by a spring 726 so that the armature 725 is spaced apart from a rearward blade restraining magnet 727. The biasing force of the spring 726 is smaller than the biasing force of the spring 723 which is being charged. A pin 728 is secured to the lever 724, and this pin 728 rotates the locking lever 700 when the lever 724 is rotated by the spring 726. The levers 700, 721 and 724 are rotatably supported on a common shaft 729.

The roller 720 having so far borne against the portion of the control member 716 in which the amount of lift is great is rotated clockwisely by the biasing force of the spring 723 with the clockwise rotation of the control member 716 whereby the force of the spring 723 becomes weaker than that of the spring 726. This rotation of the roller 720 is stopped by the pin 722 colliding against the arm 700b of the locking lever 700. This collision imparts to the locking lever 700 an impact force which rotates the same lever clockwisely. However, since the relation between the locking lever 700 and the pin 728 is determined so that the engagement between the two is released when the former rotates clockwisely, said impact force is substantially not transmitted to the lever 724. If the impact force should be transmitted to the armature 725 through the lever 724, the armature 725 will become separate from an electromagnet 727 or noise will be created in the coil of the electromagnet 727 to cause malfunctioning of the electric shutter circuit.

In the present embodiment, the impact force is not transmitted to the armature as noted above and therefore, the above-mentioned malfunctioning is never caused.

The structure including control member 716, roller 720, lever 721, pin 722, spring 723, lever 700, pin 728, lever 724, spring 726 and armature 725 may be adapted to the forward blade.

When the electromagnet 727 is deenergized by the action of the electric shutter circuit, the lever 724 is rotated clockwisely by the spring 726, and this rotation rotates the locking lever 700 clockwisely through the pin 728 to thereby release the restraint of the rearward blade driving lever 528. This release causes rotation of the lever 528 and terminates the exposure. In synchronism with this termination, the motor is started for reverse revolution and the driving shaft 6 is rotated counter-clockwisely. During the 180° counter-clockwise rotation of the driving shaft 6, the cam plate 705 rotates the charging lever 704 counter-clockwisely through the roller 706, and this rotation in turn rotates the forward blade driving lever 44 counter-clockwisely to its shown position through the pin 709, whereupon the lever 44 is restrained by the first restraining portion 710a of the locking lever 710. This rotation of the lever 44 moves the forward blade from its non-light-intercepting position to a position in which it covers the other portion of the shutter aperture than the upper end portion thereof, and at the same time, charges the driving spring 47.

The above-mentioned counter-clockwise rotation of the charging lever 704 rotates the pin 715 counter-clockwisely through the gear train 712–714, and this pin 715 rotates the control member 716 counter-clockwisely to its shown position and charges the spring 719. The projection 716a of the control member is restrained in its shown position by the locking lever 717.

The above-mentioned rotation of the control member 716 rotates the reset lever 721 counter-clockwisely because the high lift portion thereof raises the roller 720, and rotates the locking lever 700 counter-clockwisely through the spring 723 until the arm 700a bears against the driving lever 528 as shown. Even after this rotation of the lever 700 has been stopped, the above-mentioned rotation of the reset lever 721 is continued and the spring 723 is sufficiently charged. Accordingly, in the shown position, the locking lever 700 is biased counter-clockwisely by the spring 723 and when, as described above, the driving lever 528 is rotated counter-clockwisely in response to shutter release operation, the locking lever 700 is rotated by a slight mount counter-clockwisely by the force of the spring 723 to restrain the driving lever 528 and to rotate the lever 724 counter-clockwisely to thereby cause the armature 725 to come into contact with the magnet 727.

The driving shaft 6, even after rotated counter-clockwisely through 180°, is further rotated in the same direction integer times as much as 360°, whereby winding-up of the film and charging of the quick return mirror of the single lens reflex camera are effected.

In the constructions of FIGS. 15 and 16, the rearward blade charging mechanism 515, 516 and the forward blade charging mechanism 604, 607, 704 are connected to the motor through the one-way transmission mechanism 510–514 which transmits only the forward revolution of the motor and the transmission mechanism 601, 602, 705, 706 which transmits both of the forward and reverse revolutions of the motor, respectively, and this leads to the following advantage.

The forward revolution of the motor requires only a very short time because it is used for the charging of the rearward blade, whereas the reverse revolution of the motor requires a considerably long time because it is used for the charging of the forward blade and film feeding. It is very undesirable in respect of the waste of electrical energy and the increase in motor load that the long-time reverse revolution of the motor be wastefully transmitted to the rearward blade charging mechanism. Accordingly, the one-way transmission mechanism 510–514, in spite of its complicated construction, is used to block the transmission of the reverse drive force of the motor to the rearward blade charging mechanism. On the other hand, the forward revolution of the motor is only for a very short time even if it is wastefully transmitted to the forward blade charging mechanism and therefore, it is negligible in respect of the waste of electrical energy, etc. Accordingly, use is made of the transmission mechanism 601, 602, 705, 706 which is simple in construction.

In the above-described embodiments, a so-called longitudinally moving shutter which moves along the shorter sides of the shutter aperture has been shown, but the present invention is also applicable to a shutter which moves along the longer sides of the shutter aperture. Further, effecting the charging of the shutter closing member immediately before the shutter exposure operation (at the early stage of the shutter release operation) and effecting the charging of the shutter opening member immediately after completion of the exposure is applicable not only to the blade shutters as shown in the above-described embodiments, but also to the so-called roller blind shutters in which the aperture is opened and closed by the opening member and closing member formed of flexible curtain being wound on drums. Further, when the present invention is applied to the shutter of a single lens reflex camera, the operation to retract the quick-return-mirror out of the picture-taking optical path and the operation to move the closing member to its non-light-intercepting position can be accomplished at a time by the motor, and this leads to simplification of the mechanism.

I claim:

1. A shutter mechanism of a camera including:
   (1) opening means movable between a light-intercepting position in which it shields a shutter aperture from light and a non-light-intercepting position in which it does not shield the shutter aperture from light;
   (2) closing means movable between a light-intercepting position in which it shields the shutter aperture from light and a non-light-intercepting position in which it does not shield the shutter aperture from light;
   (3) first spring means for biasing said opening means so that said opening means is moved from said light-intercepting position to said non-light-intercepting position;
   (4) second spring means for biasing said closing means so that said closing means is moved from said non-light-intercepting position to said light-intercepting position;
   (5) electrical driving means;
   (6) first charge means receiving the drive force of said driving means for moving said opening means from said non-light-intercepting position to said light-intercepting position or the vicinity thereof and charging said first spring means immediately after said closing means has reached said light-intercepting position from said non-light-intercepting position;

(7) second charge means receiving the drive force of said driving means for moving said closing means from said light-intercepting position to said non-light-intercepting position and charging said second spring means, in response to a shutter release operation;

(8) means for permitting said first spring means to drive said opening means from said light-intercepting position to said non-light-intercepting position after the movement of said closing means to said non-light-intercepting position by said second charge means, thereby starting exposure; and (9) means for permitting said second spring means to drive said closing means from said non-light-intercepting position to said light-intercepting position in a predetermined time after the starting said exposure, thereby terminating the exposure.

2. A shutter mechanism according to claim 1, wherein said first charge means charges said first spring means simultaneously with the movement of said opening means, and said second charge means charges said second spring means simultaneously with the movement of said closing means.

3. A shutter mechanism according to claim 1, wherein said driving means is an electric motor, said first charge means effects said movement of said opening means and said charging of said first spring means according to the revolution of said motor in one direction, and said second charge means effects said movement of said closing means and said charging of said second spring means according to the revolution of said motor in the opposite direction.

4. A shutter mechanism according to claim 1, wherein said first charge means brings said opening means to the vicinity of said light-intercepting position in which said opening means shields most of the shutter aperture from light but does not shield the remainder of the shutter aperture from light, and said second charge means moves said opening means from said vicinity to said light-intercepting position while it moves said closing means from said light-intercepting position to said non-light-intercepting position.

5. A shutter mechanism according to claim 1 further comprising locking member including a first and a second engaging portions, said first engaging portion being engaged with said opening means to lock it at said vicinity of said light-intercepting position, said second engaging portion being engaged with said opening means to lock it at said light-intercepting position.

6. A shutter mechanism according to claim 1, wherein said driving means is a reversible motor, and said shutter mechanism includes:

(a) first transmission means provided between said motor and said second charge means to transmit only the revolution of said motor in one direction to said second charge means; and (b) second transmission means provided between said motor and said first charge means to transmit the revolutions of said motor in both directions to said first charge means.

7. A camera including:
(1) an electric motor;
(2) a shutter mechanism for opening and closing a shutter aperture to thereby control the exposure of a film, said shutter mechanism including:
(a) opening means movable between a light-intercepting position in which it shields said aperture from light and a non-light-intercepting position in which it does not shield said aperture from light, said opening means being moved from said non-light-intercepting position to said light-intercepting position by the drive force of said motor;

(b) closing means movable between a light-intercepting position in which it shields said aperture from light and a non-light-intercepting position in which it does not shield said aperture from light, said closing means being moved from said light-intercepting position to said non-light-intercepting position by the drive force of said motor;

(c) first spring means charged by said motor, said first spring means moving said opening means from said light-intercepting position to said non-light-intercepting position by the biasing force thereof; and (d) second spring means charged by said motor, said second spring means moving said closing means from said non-light-intercepting position to said light-intercepting position by the biasing force thereof;

(3) film transport means for moving the film by an amount corresponding to one frame by the drive force of said motor; and (4) control means for operating said motor in response to a shutter release operation to effect the charging of said second spring means and the movement of said closing means to said non-light-intercepting position, thereafter permitting the movement of said opening means to said non-light-intercepting position by the biasing force of said first spring means, permitting the movement of said closing means to said light-intercepting position by the biasing force of said second spring means after a predetermined exposure time, thereafter operating said motor to effect the charging of said first spring means and the movement of said opening means to said light-intercepting position, and thereafter permitting the operation of said film transport means by said motor.

8. A shutter mechanism for a camera comprising:
(1) opening means movable between a light-intercepting position in which it shields a shutter aperture from light and a non-intercepting position in which it does not shield said aperture from light;

(2) closing means movable between a light-intercepting position in which it shields said aperture from light and a non-shielding position in which it does not shield said aperture from light;

(3) an electric motor for moving said opening means from said non-intercepting position to said light-interception position immediately after closing means has reached said light-intercepting position from said non-intercepting position and for moving said closing means from said light-intercepting position to said non-intercepting position in response to a shutter release operation;

(4) first spring means charged by said motor, said first spring means moving said opening means from said light-intercepting position to said non-intercepting position by the biasing force thereof immediately after movement of said closing means to said non-intercepting position by said motor;

(5) second spring means charged by said motor, said second spring means moving said closing means from said non-intercepting position to said light-intercepting position by the biasing force thereof after movement of said opening means to said non-intercepting position.

9. A shutter mechanism in a camera comprising:
(1) opening means for opening a shutter aperture when it is moved from an initial position;
(2) closing means for closing said shutter aperture when it is moved from an initial position;
(3) electromagnet means (727) for producing attracting force;
(4) armature member (724) including an armature (725), said armature member being movable between an attraction position in which said armature can be attracted to said electromagnet means and a non-attraction position in which said armature cannot be attracted to said electromagnet means;
(5) a first spring (726) for urging said armature member toward said non-attraction position;
(6) locking member (700) movable between a lock position for locking one of said opening and said closing means at its initial position and a release position for releasing said locking,
said locking member and said armature member being so interlocked each other that movement of said locking member toward said lock position causes movement of said armature member toward said attraction position and that movement of armature member toward said non-attraction position causes movement of said locking member toward said release position;
(7) charging member (720, 721, 722) movable between a charging position and a non-charging position;
(8) a second spring (723) connected between said locking member and said charging member,
said second spring being charged by movement of said charging member to said charging position to urge both said locking member toward said locking position and said charging member toward said non-charging position, said second spring which is charged producing greater force than that said first spring;
(9) a retaining member (716) for moving said charging member to said charging position to charge said second spring and retaining said charging member at said charging position against the force of said second spring;
said movement of said charging member causing said locking member to be moved toward said locking position through said second spring to thereby move said armature member toward said attraction position against the first spring, said retaining member permitting movement of said charging member to said non-charging position by the force of said second spring in response to a shutter release operation, said movement of said charging member to said non-charging position permitting said armature member to be moved to said non-attraction position by the force of said first spring upon extinction of said attracting force to thereby move said locking member to said release position.

* * * * *